(12) United States Patent
Patterson et al.

(10) Patent No.: US 10,012,368 B2
(45) Date of Patent: Jul. 3, 2018

(54) ANGLE AND ALIGNMENT ADJUSTING METHOD FOR A DISPLAY

(71) Applicant: Barco, Inc., Duluth, GA (US)

(72) Inventors: Marcus Robert Patterson, Glenfield (NZ); Grant Arthur John Elliott, Tai Po (HK)

(73) Assignee: Barco, Inc., Duluth, GA (US)

( * ) Notice: Subject to any disclaimer, the term of this patent is extended or adjusted under 35 U.S.C. 154(b) by 0 days.

(21) Appl. No.: 15/634,932

(22) Filed: Jun. 27, 2017

(65) Prior Publication Data

US 2017/0292685 A1    Oct. 12, 2017

Related U.S. Application Data

(63) Continuation of application No. 14/601,176, filed on Jan. 20, 2015, now Pat. No. 9,689,563, which is a continuation of application No. 13/412,497, filed on Mar. 5, 2012, now Pat. No. 8,935,867, which is a
(Continued)

(51) Int. Cl.
| | |
|---|---|
| *G09F 13/04* | (2006.01) |
| *F21V 21/14* | (2006.01) |
| *F21V 21/005* | (2006.01) |
| *G09F 9/302* | (2006.01) |
| *G09F 15/00* | (2006.01) |
| *G09F 9/33* | (2006.01) |
| *F21Y 115/10* | (2016.01) |

(Continued)

(52) U.S. Cl.
CPC ............ *F21V 21/14* (2013.01); *F21V 21/005* (2013.01); *G09F 9/3026* (2013.01); *G09F 9/33* (2013.01); *G09F 15/0068* (2013.01); *F21Y 2113/13* (2016.08); *F21Y 2115/10* (2016.08); *G09F 13/00* (2013.01); *G09F 13/04* (2013.01)

(58) Field of Classification Search
CPC ........... G09F 13/04; G09F 13/00; G09F 13/14
USPC ..... 40/541, 448; 403/381, 401, 402; 52/463, 52/506.06, 506.1; 362/97.1, 147, 249.06, 362/382
See application file for complete search history.

(56) References Cited

U.S. PATENT DOCUMENTS

| | | | |
|---|---|---|---|
| 4,209,934 A | 7/1980 | Ogawa | |
| 5,128,662 A * | 7/1992 | Failla | G06F 1/1601 248/924 |
| 5,410,328 A | 4/1995 | Yoksza et al. | |

(Continued)

FOREIGN PATENT DOCUMENTS

| | | |
|---|---|---|
| EP | 1365376 | 11/2003 |
| EP | 1524640 | 4/2005 |

(Continued)

*Primary Examiner* — Syed A Islam
(74) *Attorney, Agent, or Firm* — Aka Chan LLP

(57) ABSTRACT

A light-emitting display system has an alignment mechanism to align or angle light-emitting tiles of the display. A first tile connects to a second tile by joining a first clamp portion on the first tile with a second clamp portion on the second tile. In an implementation, the alignment mechanism includes a replaceable angle adjustment insert that is inserted into at least one of the clamp portions, such as the first clamp portion. When the first and second clamp portions are joined, a surface of the second clamp portion presses against the insert and a desired angle between the first and second tile is formed. The insert can have any angle so that any desired angle can be formed between the first and second tiles.

35 Claims, 12 Drawing Sheets

Related U.S. Application Data continuation of application No. 12/485,028, filed on Jun. 15, 2009, now Pat. No. 8,136,277.

(51) Int. Cl.
*F21Y 113/13* (2016.01)
*G09F 13/00* (2006.01)

(56) References Cited

U.S. PATENT DOCUMENTS

| | | | |
|---|---|---|---|
| 5,946,875 A | 9/1999 | Jeanseau | |
| 6,029,831 A * | 2/2000 | Miller | E04B 2/7425 211/182 |
| 6,252,564 B1 | 6/2001 | Albert et al. | |
| 6,314,669 B1 | 11/2001 | Tucker | |
| 6,498,592 B1 | 12/2002 | Matthies | |
| 6,704,989 B1 | 3/2004 | Lutz et al. | |
| 6,813,853 B1 | 11/2004 | Tucker | |
| 7,063,449 B2 | 6/2006 | Ward | |
| 7,071,620 B2 | 7/2006 | Devos et al. | |
| 7,102,601 B2 | 9/2006 | Devos et al. | |
| 7,766,508 B2 | 8/2010 | Villard et al. | |
| 8,007,121 B2 | 8/2011 | Elliott et al. | |
| 2002/0003592 A1 | 1/2002 | Hett et al. | |
| 2002/0097967 A1 | 7/2002 | Lowry | |
| 2002/0154259 A1 | 10/2002 | Freidhoff et al. | |
| 2002/0168157 A1 | 11/2002 | Walker et al. | |
| 2003/0016227 A1 | 1/2003 | Matthies | |
| 2005/0178034 A1* | 8/2005 | Schubert | G09F 9/33 40/605 |
| 2005/0225733 A1 | 10/2005 | Dwyer et al. | |
| 2005/0278998 A1* | 12/2005 | Sawhney | G09F 9/33 40/541 |
| 2006/0044215 A1 | 3/2006 | Brody et al. | |
| 2006/0290596 A1 | 12/2006 | Kweon et al. | |
| 2007/0000849 A1 | 1/2007 | Lutz et al. | |
| 2007/0252056 A1 | 11/2007 | Novin | |
| 2008/0037284 A1 | 2/2008 | Rudisill | |
| 2008/0278998 A1 | 11/2008 | Cowbum et al. | |
| 2009/0034241 A1 | 2/2009 | Coushaine et al. | |
| 2009/0310065 A1 | 12/2009 | Dunn | |

FOREIGN PATENT DOCUMENTS

| | | |
|---|---|---|
| FR | 2797341 | 2/2001 |
| JP | 8-314014 A | 11/1996 |

\* cited by examiner

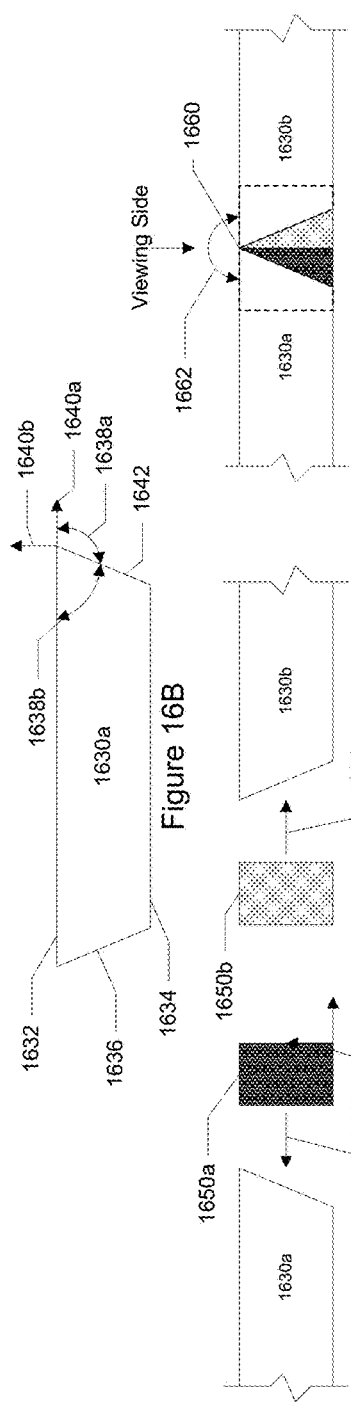
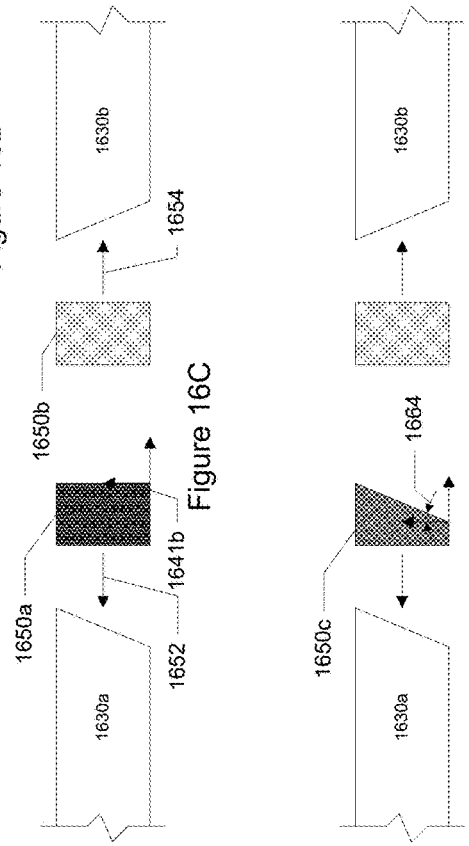
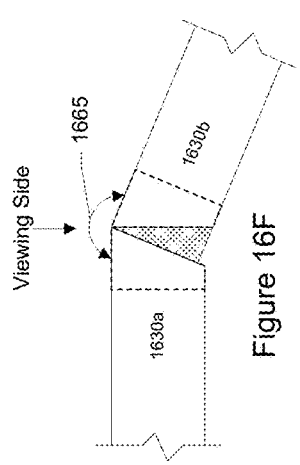
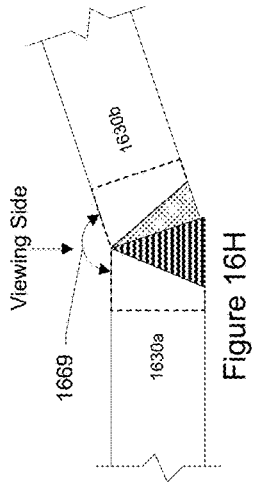
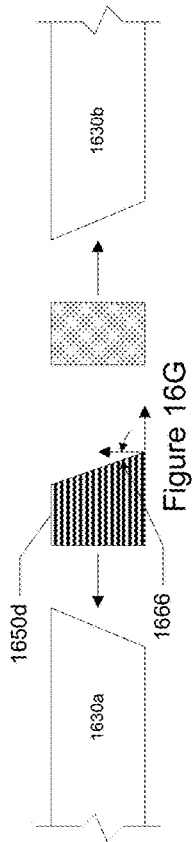

ANGLE AND ALIGNMENT ADJUSTING METHOD FOR A DISPLAY

CROSS-REFERENCE TO RELATED APPLICATIONS

This patent application is a continuation of U.S. patent application Ser. No. 14/601,176, filed Jan. 20, 2017, issued as U.S. Pat. No. 9,689,563 on Jun. 27, 2017, which is a continuation of U.S. patent application Ser. No. 13/412,497, filed Mar. 5, 2012, issued as U.S. Pat. No. 8,935,867 on Jan. 20, 2015, which is a continuation of U.S. patent application Ser. No. 12/485,028, filed Jun. 15, 2009, issued as U.S. Pat. No. 8,136,277 on Mar. 20, 2012, which is a continuation-in-part of U.S. patent application Ser. No. 12/484,203, filed Jun. 13, 2009, and claims the benefit of U.S. provisional patent applications 61/061,338; 61/061,347; 61/061,353; 61/061,358; 61/061,365; and 61/061,369, all filed Jun. 13, 2008. These applications are incorporated by reference along with all other references cited in this application.

BACKGROUND OF THE INVENTION

This disclosure generally relates to display units and particularly to a display unit including groups of light-emitting elements mounted to a support structure such that the display may be configured in nonplanar configurations while retaining both strength and positional accuracy. The invention discloses improvements in the structure and manufacture of such systems.

Display units for entertainment, architectural, and advertising purposes have commonly been constructed of numbers of light-emitting elements such as LEDs or incandescent lamps mounted onto flat tiles. The light-emitting elements can be selectively turned on and off to create patterns, graphics, and video displays for both informational and aesthetic purposes. These displays may be constructed as tiles or large panels which are assembled in position for a specific entertainment show or event or as an architectural or advertising display.

When such a display is used for an event or theatrical production, it is desirable that the display be easily removable, for example in between scenes of a play or theatrical event, as the needs of the production dictate. Some systems use a tile based structure where a tile, typically around 61 centimeters×61 centimeters (i.e., 2 feet×2 feet), can be lifted by hand and positioned. Accurate positioning of the tiles may be a time consuming and complex process involving skilled personnel.

Displays of these types may be constructed at different resolutions where the spacing between the light-emitting elements can be varied. It may also be a requirement to change this spacing at different points on the display. Further prior art systems, such as the VersaPixel manufactured by Element Labs, use suspended light-emitting elements as a ceiling or roof to an area. It would be advantageous to have a support and installation structure for such a display that is simple to install and that facilitates use in differing resolutions and on different planes through a single easily adjustable structure.

Small errors in the positioning of the pixels within tiles and tiles within a display can be cumulative and may lead to large errors in overall pixel alignment accuracy. At the same time the display support system must be strong enough to support a large area of display tiles and to withstand side loads from wind and weather if used outside. The goal of simultaneous strength, rigidity, and accuracy is one that is not achieved in prior art systems and the user typically has to accept a reduced accuracy in order to achieve the required strength.

The disclosed invention solves these problems and discloses improvements in the structure and manufacture of such display units so as to provide a single comprehensive display system and support structure capable of providing both strength and rigidity in both planar and nonplanar arrangements while also presenting a high level of accuracy for tile and pixel placement.

BRIEF SUMMARY OF THE INVENTION

A light-emitting display system has an alignment mechanism to align or angle light-emitting tiles of the display. A first tile connects to a second tile by joining a first clamp portion on the first tile with a second clamp portion on the second tile. In an implementation, the alignment mechanism includes a replaceable angle adjustment insert that is inserted into at least one of the clamp portions, such as the first clamp portion. When the first and second clamp portions are joined, a surface of the second clamp portion presses against the insert and a desired angle between the first and second tile is formed. The insert can have any angle so that any desired angle can be formed between the first and second tiles.

In a specific implementation, one or more edges of the tile itself are beveled. This allows a "pivot point" between two tiles (i.e., first and second tiles) to be roughly in-line with the front of the LEDs. In this specific implementation, angling the two tiles does not add an extra gap between the panels or between pixels. The angle adjustment dowel is interchangeable and it provides the "stop" that determines the actual angle between tiles or panels.

In a specific implementation, a light-emitting display system includes a first light-emitting tile. The first light-emitting tile has a number of light-emitting elements and is attached to a first connecting member and a first adjustment plate. The system includes a second light-emitting tile. The second light-emitting tile has a number of light-emitting elements and is attached to a second connecting member and a second adjustment plate attached. The first connecting member is configured to connect with the second connecting member such that the first light-emitting tile is disposed adjacent to the second light-emitting tile. The first adjustment plate is configured to abut the second adjustment plate when the first connecting member connects with the second connecting member.

The first adjustment plate may be removably attached to the first light-emitting tile and the second adjustment plate may be removably attached to the second light-emitting tile. The first connecting member may be configured to removably connect with the second connecting member. At least one of the first adjustment plate and the second adjustment plate may be wedge shaped. At least one of the first adjustment plate and the second adjustment plate may include surfaces that are angled with respect to each other.

Furthermore, in an implementation, the first connecting member is attached adjacent an edge of the first light-emitting tile. In this implementation, the second connecting member is attached adjacent an edge of the second light-emitting tile. The first adjustment plate and the second adjustment plate may be configured to be disposed between the first connecting member and the second connecting member when connected.

A side of the first light-emitting tile may be disposed adjacent to a side of the second light-emitting tile when the first connecting member connects with the second connecting member. The first adjustment plate may be configured to abut the second adjustment plate such that a viewing side of the display system is one of a substantially concave, planar, and convex surface. The first connecting member may include a male connecting member and the second connecting member may include a female connecting member. The first connecting member may include a clip and the second connecting member may include a receptacle.

In an implementation, a light-emitting display system includes a first light-emitting tile. The first light-emitting tile has a number of light-emitting elements. There is a first connecting member attached adjacent to an edge of the first light-emitting tile, and a first adjustment plate attached adjacent to the first connecting member. There is a second light-emitting tile. The second light-emitting tile has a number of light-emitting elements. There is a second connecting member attached adjacent to an edge of the second light-emitting tile, and a second adjustment plate attached adjacent to the second connecting member. There is a structural support having a first attachment mechanism and a second attachment mechanism. In this implementation, the first connecting member is connected to the second connecting member. The first adjustment plate and the second adjustment plate abut each other and are disposed between the first connecting member and the second connecting member. The first attachment mechanism attaches to the first light-emitting tile and the second attachment mechanism attaches to the second light-emitting tile.

The first adjustment plate and the second adjustment plate may abut each other such that a viewing side of the display system is one of a substantially concave, planar, and convex surface.

In an implementation, a method of manufacturing a display tile includes providing the display tile having a viewing surface and a back surface, disposing a number of light-emitting elements on the viewing surface of the display tile, attaching a connecting member to an edge of the back surface, where the connecting member is configured to connect with another connecting member, and attaching an adjustment plate adjacent to the connecting member.

The connecting member may include one of a male connecting member (e.g., clip) and a female connecting member (e.g., receptacle) and may be configured to connect with the other of the male connecting member and the female connecting member.

In a specific implementation, a device includes a first display tile having a plurality of light-emitting diodes on a display side of the tile and a plurality of angle adjustment receptacles on a rear side of the tile. The plurality of angle adjustment receptacles extend through side edges of the first tile. There is a first angle adjustment dowel having a first surface and a first dowel projecting away from the first surface. When the first angle adjustment dowel is received by a first angle adjustment receptacle, the first dowel points towards a first side edge and a first angle is between the display side and the first surface. There is also a second angle adjustment dowel having a second surface and a second dowel projecting away from the second surface. When the second angle adjustment dowel replaces the first angle adjustment dowel, a second angle, different from the first angle, is between the display side and the second surface.

Furthermore, there can be a third angle between the display side and the first side edge where the third angle is the same as the first angle.

In another implementation, there is a third angle adjustment dowel and a second angle adjustment receptacle which receives the third angle adjustment dowel. The second and first angle adjustment receptacles extend through the first side edge. The third angle adjustment dowel is identical to the first angle adjustment dowel.

There may be a second display tile having a dowel receptacle formed on a side edge of the second display tile to receive the first dowel.

In a specific implementation, a method includes providing a display tile having a front surface and a back surface. The front surface includes light emitting elements and a first side edge of the tile includes a first side surface joining the front and back surfaces. The method further includes providing at least one receptacle accessible from the back surface of the tile, where the receptacle extends to the first side edge of the display tile. The method further includes providing a first angle adjustment block that removably fits into the receptacle. When the first angle adjustment block is fitted in the receptacle, the first angle adjustment block has a bottom edge that touches a bottom surface of the receptacle, a second side edge of first angle adjustment block to the bottom edge is visible through a first opening at the first side edge, and a surface of the a second side edge is not coplanar with the first side surface of the display tile.

The method may further include providing a second angle adjustment block that removably fits into the receptacle. When the second angle adjustment block is fitted in the receptacle, the second angle adjustment block has a bottom edge that touches a bottom surface of the receptacle, a third side edge of second angle adjustment block to the bottom edge is visible through an opening at the first side edge, and a surface of the a third side edge is planar with the first side surface of the display tile.

The first angle adjustment block may have a stud extending from the surface of the second side edge. The stud may have a first cross-sectional shape, and the display tile can have a third edge, opposite of the first edge having a second opening with the first cross-sectional shape.

The first opening at the first side edge of the tile may have a different shape than the second opening on the third edge of the tile.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 16B shows a top view of tile having beveled edges.

FIG. 16C shows a top view of a 0-degree angle adjustment dowel being inserted into a first tile.

FIG. 16D shows a top view of the first tile interlocked with a second tile using the 0-degree angle adjustment dowel.

FIG. 16E shows a top view of a positive-degree angle adjustment dowel being inserted into the first tile.

FIG. 16F shows a top view of the first tile interlocked with the second tile using the positive-degree angle adjustment dowel.

FIG. 16G shows a top view of a negative-degree angle adjustment dowel being inserted into the first tile.

FIG. 16H shows a top view of the first tile interlocked with the second tile using the negative-degree angle adjustment dowel.

DETAILED DESCRIPTION OF THE INVENTION

Figure 1:
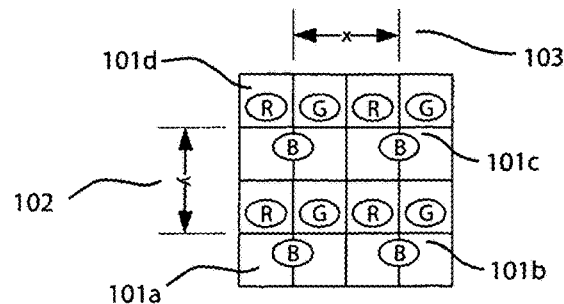
FIG. 1 shows four pixels in a video display.

FIG. 1 shows four pixels in a video display. Each pixel 101a, 101b, 101c, and 101d may be constructed from 3 LEDs: red (R), green (G), and blue (B). The distance 103 and 102 between the center of a pixel 101 and the horizontally or vertically adjacent pixels is referred to as the pixel pitch. The x-axis pixel pitch 103 may be the same as the y-axis pixel pitch 102.

In a large display with a large number of pixels it is desirable that the pixel pitch is controlled within tight tolerances. Errors in the pixel pitch across the display may be apparent to the viewer and adversely affect the image quality.

Some more details on video display products can be found in U.S. patent application Ser. No. 12/415,627, filed Mar. 31, 2009; Ser. Nos. 12/484,200, 12/484,201, 12/484,202, 12/484,205, and 12/484,206, all filed Jun. 13, 2009; and U.S. provisional patent application 61/072,597, filed Mar. 31, 2008, and 61/170,887, filed Apr. 20, 2009, which are incorporated by reference.

Figure 2:
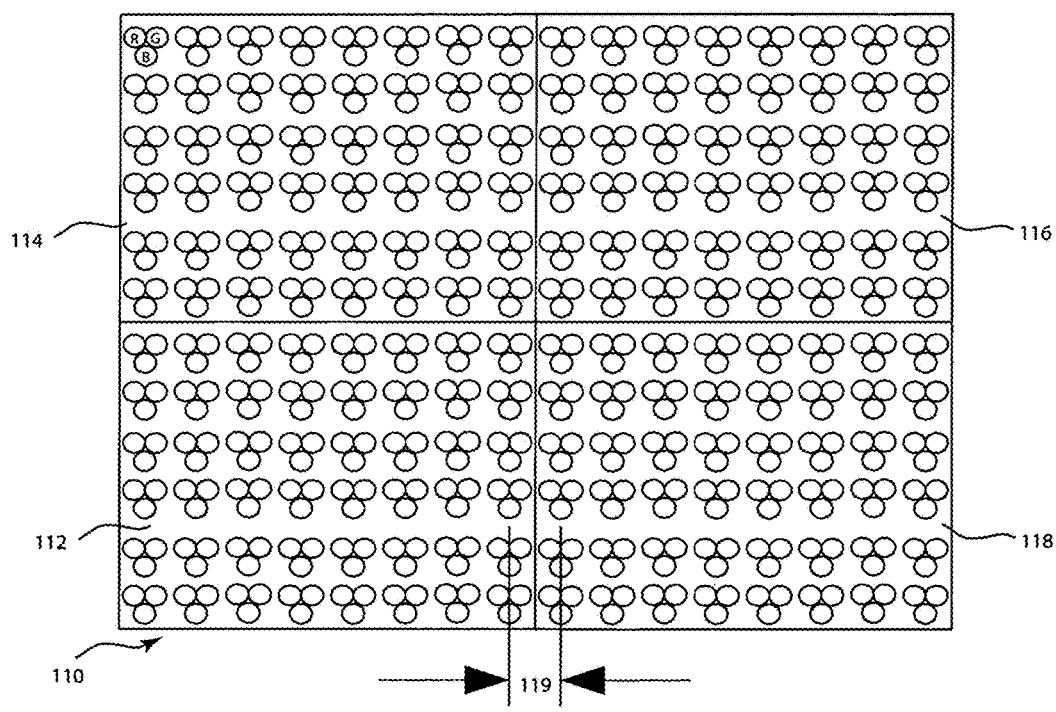
FIG. 2 shows a portion of a modular video display.

FIG. 2 illustrates a portion of a modular video display 110 where display modules 112, 114, 116, and 118 are mounted adjacent to each other to form a single display. Control of pixel alignment and pitch within a single module may be accomplished through such means as accurate component placement on a printed circuit board within the module housing. The modules may be constructed from plastic, and be sufficiently small that the tolerances within the modules can be tightly controlled.

However the pitch 119 between the pixels on adjacent modules is controlled by the accurate mechanical alignment and spacing of the individual modules. If this alignment and spacing is not accurately maintained, gaps may appear in the display which appear darker when the screen is set to black. Additionally, banding can appear due to perceived luminance errors. For example, if the pixel pitch between modules is greater than the pixel pitch within the module, then the effective area subtended to the viewer by the pixels at the boundary is larger than those within the module. This increased effective area causes the perceived luminance of the pixels at the boundaries of the modules to be lower than the pixels within the module, thereby causing an apparent band or stripe in the image.

In a typical prior art modular display screen, a number of display modules are mounted onto a larger tile and these tiles are connected together to form the entire screen. The tiles are typically constructed from folded sheet metal, and are large compared to the modules. These tiles and their interconnection provide both the alignment of the display modules and the structural support and strength to form the mechanical infrastructure of the screen. If a screen is intended for an outdoor application then it must further be able to withstand wind loadings producing significant forces orthogonal to the screen surface.

Figure 3:
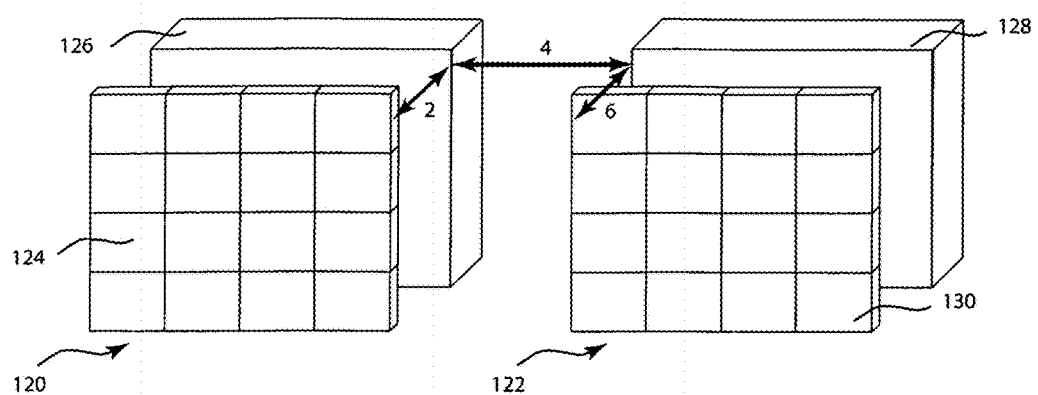
FIG. 3 shows the tolerance and alignment variables in a modular video display.

FIG. 3 shows the tolerance and alignment variables in a modular video display. A plurality of display modules 124 are assembled onto a support structure 126 to form tile 120 and a second plurality of display modules 122 are assembled onto support structure 128 to form a second tile 122. Support structures 126 and 128 are interconnected to support and align the two tiles. The alignment of the display modules 124 on tile 120 with display modules 122 on tile 122 are affected by multiple and cumulative tolerances: tolerance 2 between tile 120 and support structure 126, tolerance 4 between support structure 126 and support structure 128 and tolerance 6 between support structure 128 and tile 122.

In a prior art system such tolerances may accumulate and produce a total pixel positional error as high as ±8.25 percent (total 16.5 percent) resulting in visible and objectionable luminance difference between the pixels at the tile boundaries and the pixels within the tile. Such a gap between tiles will be noticeable and detract from a cohesive look. Although here we are referring to tolerances in a single axis, it is also important to note that these tolerances are present and important in all 3 axes.

The prior art uses the support structure 126, 128 to provide both:

1. Alignment—ensuring that the tiles align to form a cohesive display; and

2. Structural Strength or Support—ensuring that the screen can support itself safely as well as endure additional forces from wind loading in outdoor situations.

Alignment accuracy is desirable for display quality but the large structural parts needed to simultaneously achieve the strength goals may hinder that accuracy. Achieving the tight tolerances needed with large structural components can be difficult and expensive, and almost always involves large amounts of time consuming and expensive machining.

Although many such displays are flat such that all tiles are planar there are occasions when for either artistic or practical considerations a nonplanar or curved screen would be advantageous. Such a screen may be curved in either or both of the horizontal and vertical planes. Prior art displays using tiles do not provide simple means for adjusting the abutment angle of tiles to produce such a display without using complex and expensive supports custom manufactured for each installation.

This invention improves on the prior art and discloses means for assembling a modular display which provide accurate alignment of the display while allowing easy adjustment of the angle between tiles to form a nonplanar display.

Figure 4:
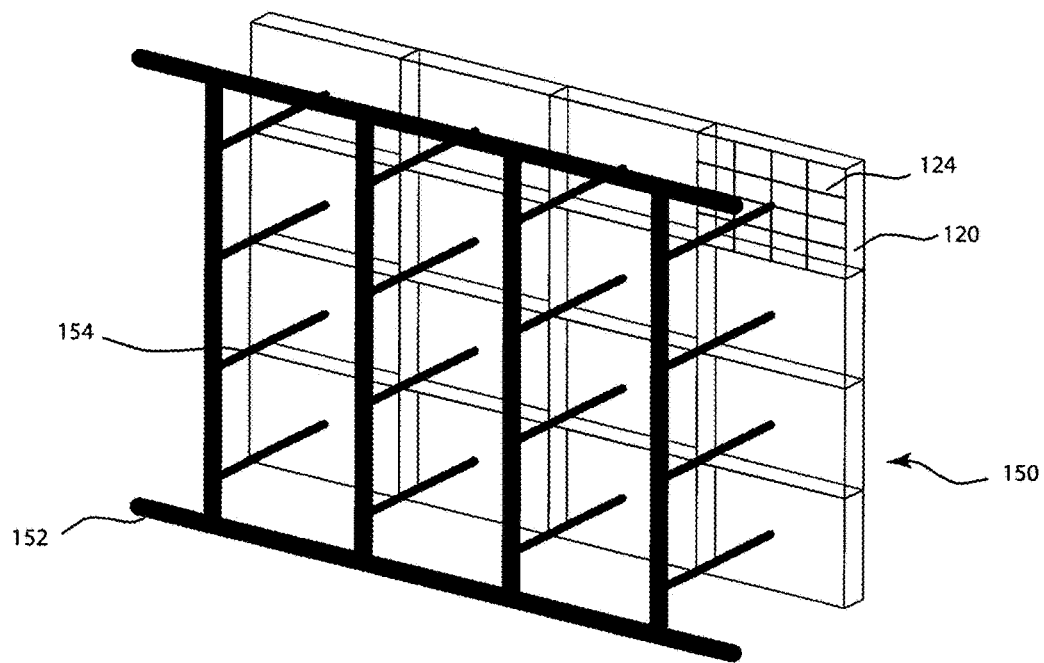
FIG. 4 shows an embodiment of the present disclosure showing the separate structural and alignment members of a video display.

FIG. 4 shows an embodiment of the present disclosure showing the separate structural and alignment members (i.e., alignment mechanism) of a video display 150. Multiple display modules 124 are assembled into a plurality of tiles 120. In a specific implementation, tiles 120 connect to adjacent tiles through attachment mechanisms such as latches, clips, clamps, mounts, rotary-lock mounts (e.g., NCC rotary-lock mount), or any other types of fastener which provide accurate and improved alignment without having any requirement (or minimal requirements) to provide support or strength to the system. Some specific examples of latches include spring latches, slam latches, cam locks, Norfolk latches, Suffolk latches, cross bars, cabin hooks, bolt lock latches, compression latches, draw latches, over center draw latches, pull draw latches, rotary action latches, concealed draw latches, fixed grip cam latches, adjustable grip cam latches, vise action compression latches, lift and turn compression latches, lever latches, and self-adjusting latches.

Removing the strength requirement from these components allows cheaper (i.e., less costly), smaller, more accurately manufactured parts to be used and ensures highly accurate alignment. For example, less material (e.g., plastic and metal), less expensive materials, or both may be used in making the attachment mechanisms because the attachment mechanisms do not have to provide structural support. In other words, in a specific implementation, the attachment mechanisms are not load-bearing or do not require design computations for bearing specific loads such as wind loads, the dead load (e.g., weight) of the tile or adjacent tiles, seismic loads, live loads, and so forth. In this specific implementation, the attachment mechanisms do not carry the weight of the tile and do not resist or transfer significant forces. In another implementation, the attachment mechanisms are designed to support the weight of the tile, but do not need to support other forces (e.g., wind).

In these specific implementations, less material needs to be used and a lighter-weighing tile can be produced as compared to tiles with attachment mechanisms that are designed to bear significant structural loads. A lighter-weighing tile offers several benefits. For example, the tile is easier to transport, assemble, disassemble, configure, reconfigure, and replace.

In other implementations, the attachment mechanisms provide at least some structural support. For example, the attachment mechanisms may provide at least some support for bearing wind loads, the dead load of the tile, or both wind loads and dead loads. In this specific implementation, the attachment mechanisms carry a portion of the load (e.g., wind load, dead load, or both). The remaining portion of the load may be carried by secondary structural support 152. Typically, the portion of the load carried by the attachment mechanisms will be less than the portion of the load carried by the secondary structural support. For example, the attachment mechanisms may carry about 1, 2, 3, 4, 5, 10, 15, 20, 25, 30, 35, 40, or 45 percent of the total load. In various other implementations, the portion of the load carried by the attachment mechanisms is the same as the load carried by the secondary structural support. The portion of the load carried by the attachment mechanisms is greater than the load carried by the secondary structural support.

A single attachment mechanism for a tile may be able to support at least the weight of the tile divided by the number of attachment mechanisms attached to the tile. In a specific implementation, a tile has two attachment mechanisms per side for a total of eight attachment mechanisms and weighs about 5 kilograms. In this specific implementation, a single attachment mechanism can support at least 0.62 kilograms (e.g., 5 kilograms/8 attachment mechanisms=0.62 kilograms).

The tiles may be manufactured using injection molding or other techniques which have inherently high levels of accuracy compared to sheet metal and machining techniques. Thus the video display will be accurately aligned and cohesive in its appearance.

In a specific implementation, structural support and strength is provided though a secondary structural support 152 which is connected to the display tiles through attachment mechanisms 154 such that the alignment of the display tiles may remain uncompromised. The secondary structural support 152 provides the strength required to support itself and the display tile and to resist other applied forces such as wind loading.

To ensure that any inaccurate alignment of structural support 152 does not compromise or affect the alignment of the display tiles 120 the interconnecting members 154 are constructed so as to take up or nullify any tolerance difference between the accurately aligned display tiles 120 and the structural support 152. Alignment accuracies up to an order (or orders) of magnitude better than the prior art system can be provided by the separation of the functions of alignment and support.

Figure 5:
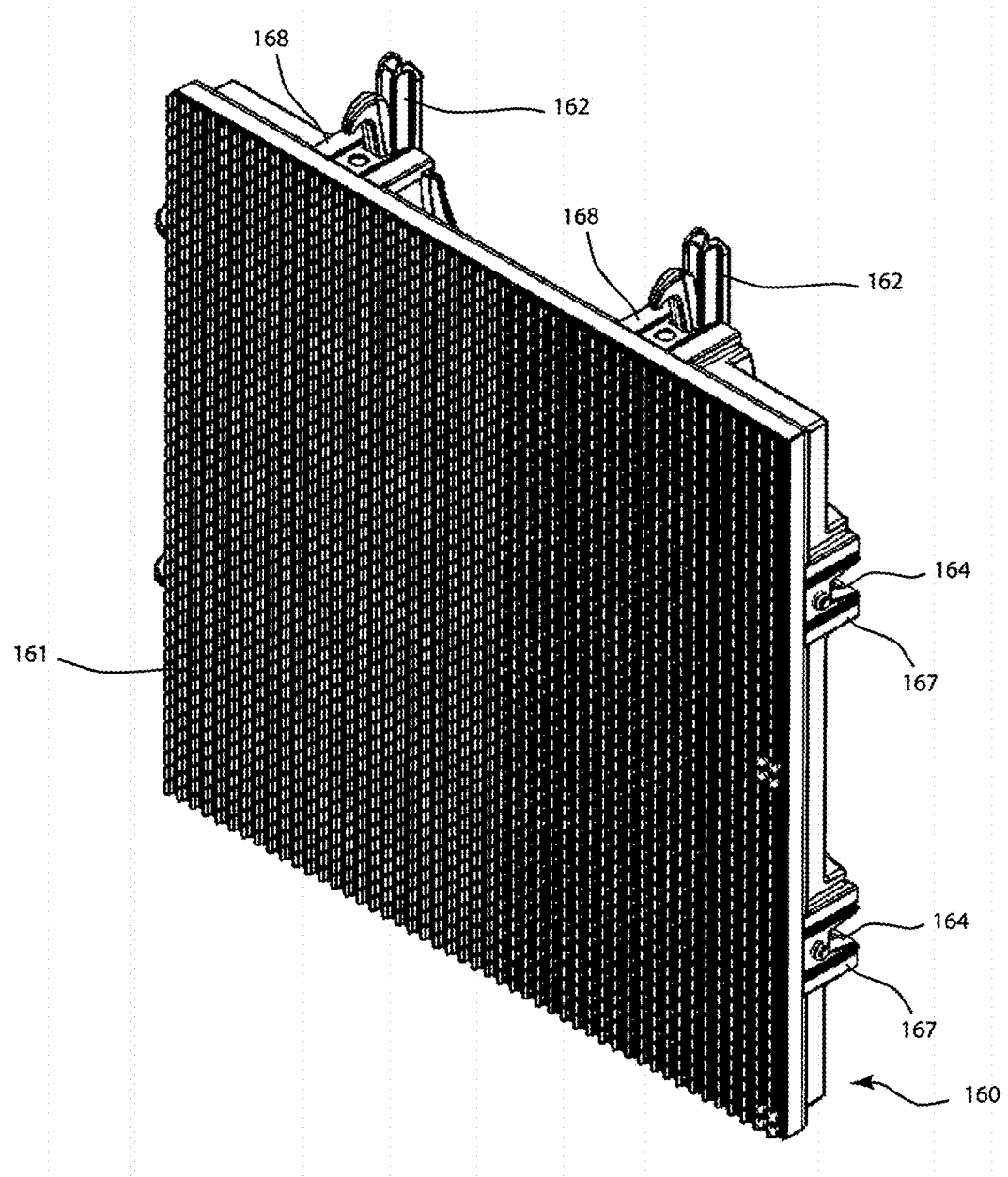
FIG. 5 shows an embodiment of the present disclosure showing an isometric view of a single tile of a video display.

FIG. 5 shows an embodiment of the present disclosure showing an isometric view of a single tile (or panel) 160 of a video display. A plurality of pixels 161 are mounted to a display tile 160. Display tile 160 is accurately constructed to very tight tolerances and may use injection molding or other inherently accurate manufacturing technique. The strength requirement for tile 160 is significantly reduced because in a specific implementation it supports itself and adjacent tiles without having to provide the additional and significantly greater strength needed to endure the stresses put on the system by wind loading when used outdoors.

Alignment between adjacent tiles 160 is provided through male connecting members, such as clips 162, and female connecting members, such as receptacles 164. In this specific implementation, the connecting members are located on a back side of the tile, but may instead or additionally be located on a front side of the tile. Clips 162 and receptacles 164 provide highly accurate alignment of adjacent tiles with a lessened requirement to transmit support or strength between those tiles. This allows the use of accurate construction to very tight tolerances which may use injection molding or any other inherently accurate manufacturing technique.

In this specific implementation, tile 160 has two connecting members on each of its four sides. A side has connecting members of a first type (e.g., male connecting members) and an opposite side has connecting members of a second type (e.g., female connecting members), different from the first type. A side has connecting members of a first type and an adjacent side has connectors of a first type or connectors of a second type. For example, a top side includes a first set of two male connecting members. A bottom side includes a second set of two female connecting members. A right-hand side includes a third set of two female connecting members. A left-hand side includes a fourth set of two male connecting members.

In another implementation, a side has connecting members of a first type and an opposite side has connecting members of the first type. It should also be appreciated that a side can have any number of connectors including no connectors, 1, 3, 4, 5, 6, 7 connectors, or more than 7 connectors. A number of connectors on one side may be equal to or different from a number of connectors on another side (e.g., opposite side or adjacent side).

Furthermore, the connectors on a side may or may not be equally spaced. The connectors may be equally distributed along a length of the side. The connectors may be equally spaced from a midpoint of the side.

In this specific implementation, the tile has four sides and has the shape of a square. In this specific implementation, a length of a side of the square is about 400 millimeters. However, the length can range from about 50 millimeters to about 5000 millimeters including, for example, 100, 200, 300, 500, 600, 700, 800, 900, 1000, 2000, 4000, or more than 5000 millimeters. In some implementations, the length is less than 50 millimeters.

It should also be appreciated that the tile can have any number of sides and can be in any shape. Some examples of other shapes include rectangles, triangles, circles, and ovals.

In a specific implementation, a tile is about 400 millimeters×400 millimeters, has a thickness of which ranges from about 62 millimeters to about 70 millimeters, and has a physical resolution of about 11.1 millimeters, 36×36 pixels, and 8100 pixels per meter squared. In another specific implementation, a tile has the same physical size, but has a physical resolution of about 16.7 millimeters, 24×24 pixels, and 3600 pixels per meter squared. However, it should be appreciated that a tile can have any size and any physical resolution depending upon the application.

Additionally, the tiles 160 may be fitted with separate angle adjustment plates 167 such that the angle between adjacent tiles may be accurately controlled and adjusted so that both planar and nonplanar displays may be constructed. The tile 160 may have separate angle adjustment plates 167 for both the horizontal and vertical planes such that a display may be constructed that is independently and simultaneously planar or nonplanar in the vertical plane and planar or nonplanar in the horizontal plane.

The angle adjustment plate 167 may be wedge shaped such that the angled surface of the wedge abuts the clamp plate 168 on the adjacent tile. Angle adjustment plates 167 may be removable and replaceable and may be constructed with a wide range of wedge angles facilitating varying angles of display alignment. The wedge angles of the angle adjustment plates may be either negative or positive allowing both convex and concave nonplanar displays. The angle adjustment plate may be referred to as an insert, dowel, pin, key, or block. In a specific implementation, the angle adjustment plate includes a label indicating its angle, is color-coded such a specific color indicates its angle.

Figure 6:
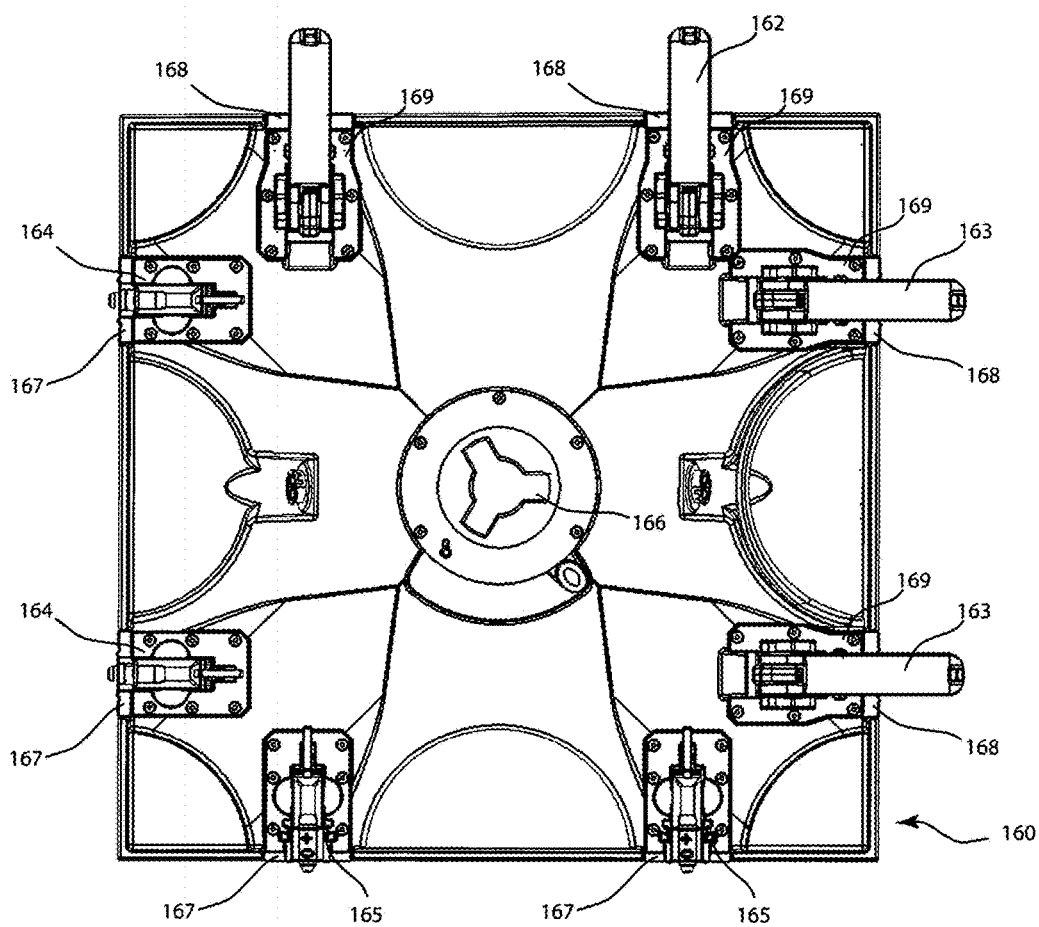
FIG. 6 shows an embodiment of the present disclosure showing the rear view of a single tile of a video display.

FIG. 6 shows a further illustration of an embodiment of the present disclosure showing the rear view of a single tile of a video display. Clips 162 on the edge of a tile may connect to receptacles 165 on the edge of the adjacent tile. When clip 162 is closed angle adjustment plate 167 will be pulled into contact with clamp plate 168 on the adjacent tile. Clip 162 is designed such that it can accommodate a wide range of angles in angle adjustment plate 167 and still maintain accurate and secure connection between the tiles.

Similarly clips 163 on a further the edge of a tile may connect to receptacles 164 on the adjacent tile and angle adjustment plates 167 will be pulled into contact with clamp plate 168. Strength and support for tile 160 is provided through center attachment point 166 which connects to the interconnecting member back to the structural support. Through such means a modular display of any size and shape may be quickly and accurately constructed.

Figure 7:
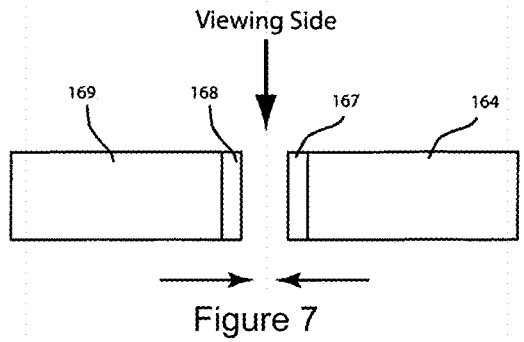
FIG. 7 shows an embodiment of the present disclosure showing a connection point in a planar open and unlocked position.
Figure 8:
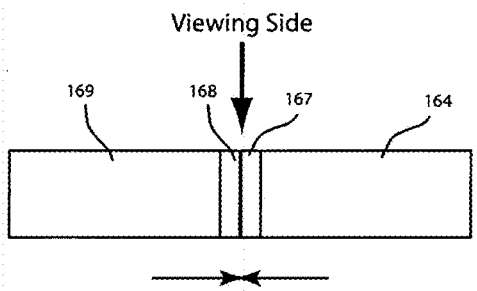
FIG. 8 shows an embodiment of the present disclosure showing a connection point in a planar closed and locked position.

FIG. 7 shows an embodiment of the present disclosure showing diagrammatically a connection point in a planar open and unlocked position. In this embodiment the replaceable angle adjustment plate 167 has a zero angle wedge so as to produce a planar display. As the two halves of the clamp 164 and 169 are pulled together the angle adjustment plate 167 abuts the clamp plate 168 such that clamp 164 remains parallel and planar with clamp 169. The closed and locked position of the planar display is illustrated in FIG. 8.

Figure 9:
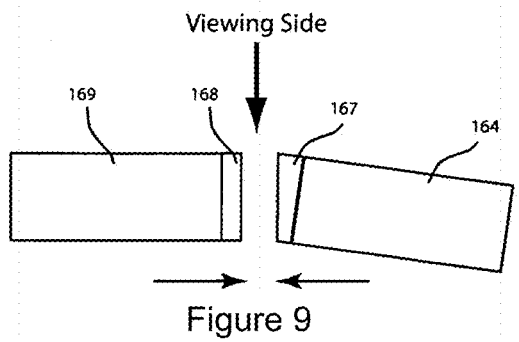
FIG. 9 shows an embodiment of the present disclosure showing a connection point in a nonplanar open and unlocked position.
Figure 10:
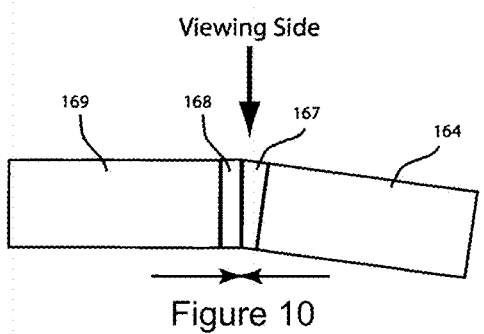
FIG. 10 shows an embodiment of the present disclosure showing a connection point in a nonplanar closed and locked position.

FIG. 9 shows a further embodiment of the present disclosure showing diagrammatically a connection point in a nonplanar open and unlocked position. In this embodiment the replaceable angle adjustment plate 167 has a nonzero angle wedge so as to produce a nonplanar display. As the two halves of the clamp 164 and 169 are pulled together the angle adjustment plate 167 abuts the clamp plate 168 such that clamp 164 is constrained to a defined angle with clamp 169 forming a corresponding nonplanar alignment of the attached display tiles. The closed and locked position of the nonplanar display is illustrated in FIG. 10.

Figure 11:
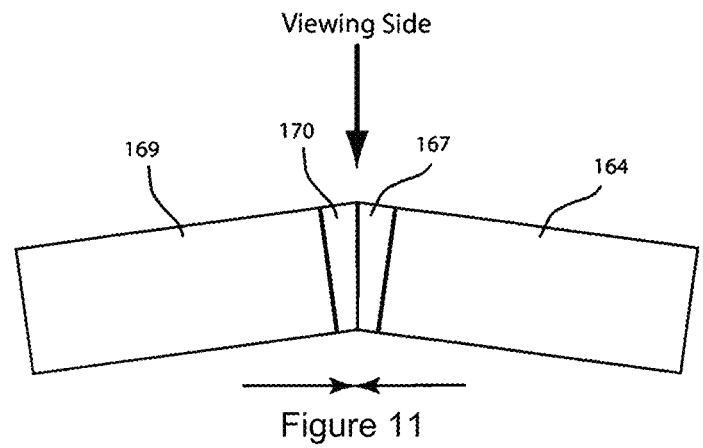
FIG. 11 shows a further embodiment of the present disclosure showing a connection point in a nonplanar closed and locked position.

In yet further embodiments of the disclosure angle adjustment plates may be fitted to both sides of the clamp. FIG. 11 shows such an embodiment of the present disclosure showing diagrammatically a connection point in a nonplanar closed and locked position. In this embodiment the replaceable angle adjustment plate has nonzero angle wedges, 167 and 170, fitted to both sides of the clamp so as to produce a nonplanar display.

The two halves of the clamp 164 and 169 are pulled together and the first angle adjustment plate 167 abuts the second angle adjustment plate 170 such that clamp 164 is constrained to a defined angle with clamp 169 forming a corresponding nonplanar alignment of the attached display tiles. The angle formed by using two angle adjustment plates may be different from that formed by using a single angle adjustment plate. The use of two equal angle adjustment plates further provides a nonplanar configuration which is symmetrical about the joint between adjacent tiles.

Figure 12:
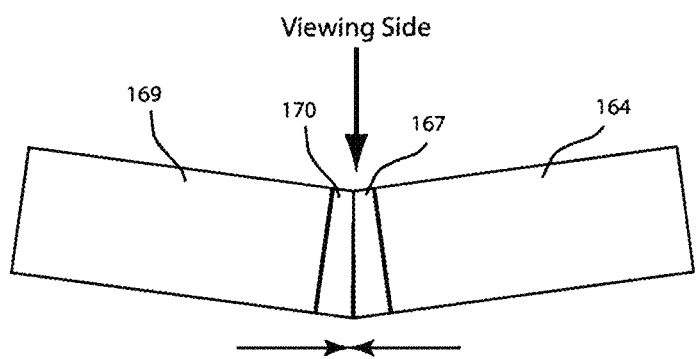
FIG. 12 shows a further embodiment of the present disclosure showing a connection point in a nonplanar closed and locked position.
Figure 14:
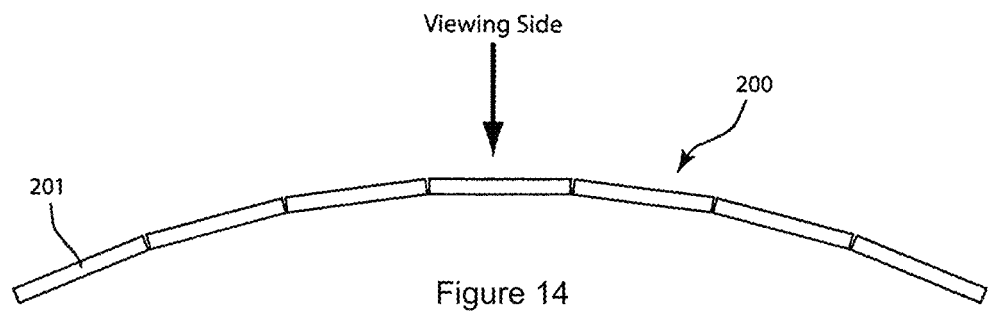
FIG. 14 shows a convex nonplanar display.
Figure 16A:
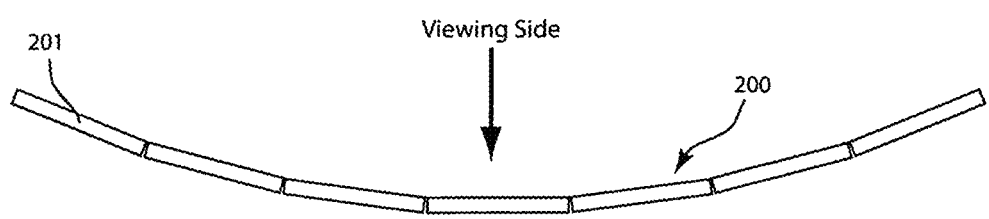
FIG. 16A shows a concave nonplanar display.

The angle adjustment plates (whether used singly or in pairs) may provide both convex or concave displays. FIG. 12 illustrates a further embodiment of the disclosure where the angle adjustment plates 167 and 170 have a negative wedge angle such that the angle between clamp halves 164 and 169 forms a concave nonplanar display as illustrated in FIG. 16A, while the angle adjustment plates 167 and 170 shown in FIG. 11 have a positive wedge angle such that the angle between clamp halves 164 and 169 forms a convex nonplanar display as illustrated in FIG. 14.

Figure 13:
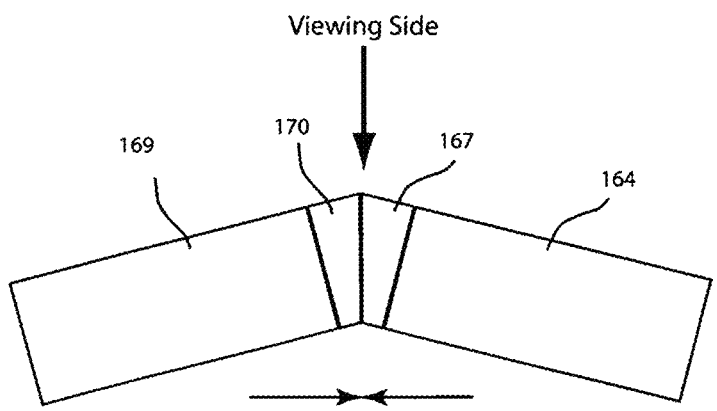
FIG. 13 shows a further embodiment of the present disclosure showing a connection point in a nonplanar closed and locked position.

FIG. 13 illustrates yet another embodiment of the disclosure where angle adjustment plates 167 and 170 have a larger wedge angle providing a more extreme convex display.

Although a small number of combinations of wedge plates and wedge plate angles have been illustrated the disclosure is not so limited and any combination of positive, zero or negative angle wedge plates may be used on either or both sides of the clamp joint without departing from the spirit of the disclosure.

The wedge plates may be designed to be easily removable and replaceable and may slide in to position, snap in to position, or both (e.g., first wedge plate slides in to position and second wedge plate snaps in to position), or may use another similar method to securely be retained by the closure of the clamp.

Figure 15:
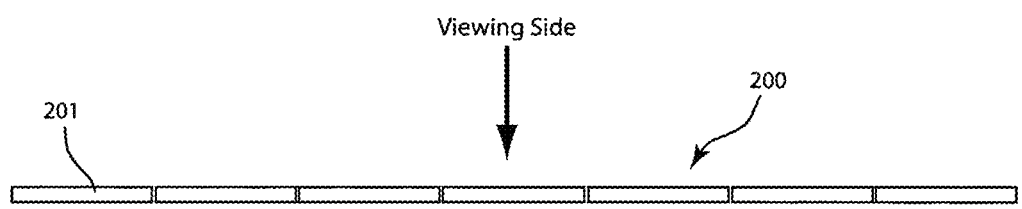
FIG. 15 shows a planar display.

FIGS. 14, 15, and 16A illustrate a convex nonplanar display (FIG. 14), planar display (FIG. 15) and concave nonplanar display (FIG. 16A). In each illustration the display 200 includes a plurality of tiles 201 joined together with clamps and angle adjustment plates as described in this application and is viewed from the side indicated. In these figures, the nonplanar shape of a display is shown only in the horizontal plane. However the disclosure is not so limited and the display may be simultaneously and independently configured to be planar or nonplanar in both the horizontal and vertical planes. Further, those having ordinary skill in the art will appreciate that in the above embodiments, though the tiles are shown as having a substantially planar shape, the present disclosure is not so limited. In other embodiments, the tiles may have a nonplanar shape, such as a convex or concave shape, without departing from the scope of the present disclosure.

In a specific implementation, a clip of a tile is designed to connect to a receptacle of an adjacent tile such that an angle between the tile and the adjacent tile can be about 180 degrees (i.e., a flat or planar display as shown in FIG. 15), greater than 180 degrees (i.e., a convex display as shown in FIG. 14), or less than 180 degrees (i.e., a concave display as shown in FIG. 16A), depending on the specific angle adjustment plate selected.

In a convex display, as shown in FIG. 14, an angle between a tile and an adjacent tile can range from about 181 degrees to about 270 degrees. This includes, for example, 185, 190, 195, 200, 205, 210, 220, 230, 240, 250, 260, more than 270 degrees, or less than 181 degrees.

In a concave display, as shown in FIG. 16A, an angle between a tile and an adjacent tile can range from about 90 degrees to about 179 degrees. This includes, for example, 100, 120, 130, 140, 150, 155, 160, 165, 170, 175, more than 179 degrees, or less than 90 degrees.

One benefit of the angle adjustment plate or insert or dowel is that any angle between two tiles can be created by simply replacing the angle adjustment insert. That is, the same tiles can be used to create a convex display (FIG. 14), a flat display (FIG. 15), or a concave display (FIG. 16A). Different tiles do not have to be used depending upon the type of display (i.e., curvature of display) desired. Significant costs savings can be realized because the insert is less costly to manufacture than a tile. An insert, unlike a tile, does not have any electrical components (i.e., LEDs, electrical wiring, circuitry, and so forth). An insert can be made wholly of one material such as plastic and is relatively small compared to a tile. A tile does not have to be manufactured according to a specific display type desired. Instead, different inserts can be used with the same tiles to create convex, flat, or concave display types.

FIG. 16B shows a top view of a specific implementation of a first tile 1630a. The tile includes a viewing side or front surface 1632, a back surface 1634, opposite the front surface, and side surfaces 1636 which join the front and back surfaces. One or more side surfaces (or edges) of the tile is beveled, slopped, slanted, inclined, diagonal, or tapered (i.e., tapers inwardly from the front surface). The one or more side surfaces is not perpendicular to the front surface. An angle 1638a between an x-axis 1640a parallel to the front surface and a side surface 1642 is not 90 degrees. In this example, angle 1638a is shown as being measured outside the tile and is greater than 90 degrees. However, as one of skill in the art would recognize, an angle to the side surface may instead be measured from the inside of the tile as an angle 1638b which is supplementary to angle 1638a. An angle to the side surface may instead be measured with respect to a y-axis 1640b which passes through the front surface and is perpendicular, normal, or orthogonal to the front surface.

In this specific implementation, angle 1638a can be any angle greater than about 90 degrees. This includes, for example, about 95, 100, 105, 110, 115, 120, 125, 135, 140, 145, 150, 155, 160, 165 degrees, or more than 165 degrees. In other implementations, the angle is 90 degrees. The angle is less than 90 degrees.

The beveled side surfaces of the tile allows two or more tiles to be assembled into a curving display such that there are no gaps between the tiles. Generally, when the display is assembled into one or more of the different shapes shown in FIGS. 14-16A, there will be no gaps between the tiles or the gaps will be small such that the gaps will not be visible to a person positioned at a typical distance away from the display. Thus, the display will appear as a single, unified, seamless display as compared to a display made up of multiple small tiles.

FIG. 16C shows a top view of joining or interlocking first tile 1630a with a second tile 1630b using one or more angle adjustment dowels to create a planar display. In this specific implementation, a first angle adjustment dowel 1650a is inserted into a side surface of the first tile as indicated by arrow 1652. A second angle adjustment dowel 1650b is inserted into a side surface of the second tile as indicated by arrow 1654.

An angle measuring 0 degrees is between a y-axis 1641b and the side surface of the first angle adjustment dowel. This angle adjustment dowel may be referred to as a zero angle adjustment dowel. The y-axis passes through the front surface of the tile and is perpendicular to the front surface. In this specific implementation, an origin of the y-axis is at a point or at an edge of the angle adjustment dowel furthest away from the front surface of the display. However, it should be appreciated that the angle of the angle adjustment dowel may be measured using any reference point.

FIG. 16D shows a top view of the interlocked first and second tiles using the zero angle adjustment dowel. The dotted lines indicate the portions of the angle adjustment dowels within the tiles. The side surface of the first angle adjustment dowel abuts a side surface of the second angle adjustment dowel. The angle adjustment dowels act as a stop or other device for arresting or limiting the rotational motion of the tiles as they pivot about a pivot point 1660 between the two tiles. The pivot point may indicate a corner or edge of the first tile that touches a corner or edge of the second tile. The pivot point may indicate a corner or edge of the first tile that is nearest to a corner or edge of the second tile. In a specific implementation, the first and second tiles are touching at the pivot point. In another implementation, the first and second tiles do not touch at the pivot point.

The angle of the angle adjustment dowels can be used to determine an angle 1662 between the two tiles. In this specific implementation, angle 1662 is about 180 degrees as shown in the figure.

FIG. 16E shows a top view of interlocking first and second tiles 1630*a* and 1630*b* using a different angle adjustment dowel from the angle adjustment dowel used in FIGS. 16C-16D to create a nonplanar display. First angle adjustment dowel 1650*a* has been replaced by a third angle adjustment dowel 1650*c* which is being inserted into the side surface of the first tile. The third angle adjustment dowel has an angle 1664 measured clockwise from y-axis 1641*b*. This angle adjustment dowel may be referred to as a positive angle adjustment dowel.

FIG. 16F shows a top view of the interlocked first and second tiles using the third angle adjustment dowel. The angled surface of the third angle adjustment dowel abuts the surface of the second angle adjustment dowel. An angle 1665 is between the first and second tiles. In this specific implementation angle 1665 is equal to 180 degrees plus angle 1664. This display may be referred to as a nonplanar convex display.

FIG. 16G shows a top view of interlocking first and second tiles 1630*a* and 1630*b* using a different angle adjustment dowel from the angle adjustment dowels used in FIGS. 16C-16F to create a nonplanar display. First angle adjustment dowel 1650*a* has been replaced by a fourth angle adjustment dowel 1650*d* which is being inserted into the side surface of the first tile. The fourth angle adjustment dowel has an angle 1666 measured counterclockwise from y-axis 1641*b*. This angle adjustment dowel may be referred to as a negative angle adjustment dowel.

FIG. 16H shows a top view of the interlocked first and second tiles using the fourth angle adjustment dowel. The angled surface of the fourth angle adjustment dowel abuts the surface of the second angle adjustment dowel. An angle 1669 is between the first and second tiles. In this specific implementation, angle 1669 is equal to 180 degrees minus angle 1666. This display may be referred to as a nonplanar concave display.

In a specific implementation, both the first and second tiles have angle adjustment dowels. In another implementation, the first tile has an angle adjustment dowel and the second tile does not have an angle adjustment dowel. In this specific implementation, angle adjustment dowel of the first tile abuts a side surface of the second tile. In another implementation, neither the first tile nor the second tile has an angle adjustment dowel. In this specific implementation, the side surface of the first tile abuts the side surface of the second tile.

It should be appreciated that an angle adjustment dowel can have any angle. The angle of the angle adjustment dowel for the first tile may be the same or different from the angle of the angle adjustment dowel for the second tile.

Figure 17:
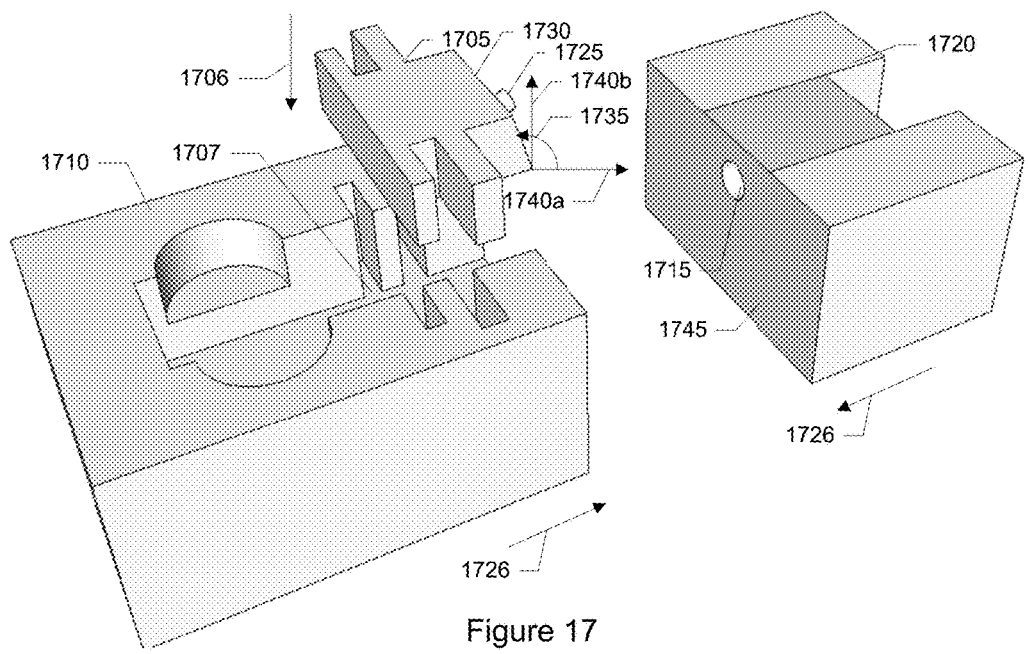
FIG. 17 shows a perspective view of a first angle adjustment dowel.

FIG. 17 shows a perspective view of a specific implementation of an angle adjustment dowel 1705 being inserted (as shown by arrow 1706) into a channel (e.g., cavity or groove) 1707 of a clamp receptacle 1710. The clamp receptacle is attached to a rear side of a tile (not shown). The figure also shows a dowel receptacle 1715 of a clamp clip 1720 which is partially shown in the figure. The clamp clip is attached to a rear side of an adjacent tile (not shown). The dowel receptacle receives a dowel 1725 of the angle adjustment dowel when the tile and the adjacent tile are connected (i.e., when the clamp receptacle of the tile is joined with the clamp clip of the adjacent tile as indicated by arrows 1726).

A surface 1730 of the angle adjustment dowel from which the dowel projects has an angle 1735. The angle is shown measured in a counterclockwise direction from an x-axis 1740*a* where the x-axis indicates zero degrees and a y-axis 1740*b* indicates 90 degrees. The x-axis is parallel to a display side of the tile. The y-axis passes through the display side of the tile and is orthogonal to the display side. As shown in this example, the angle is greater than 90 degrees and less than 180 degrees.

When the tile and the adjacent tile are joined surface 1730 of the angle adjustment dowel abuts a surface 1745 of the clamp clip. The result is a desired angle (or viewing angle) between a display side of the tile and a display side of the adjacent tile depending on angle 1735.

For example, angle 1735 of surface 1730 may be about 100 degrees (as measured from the x-axis) and surface 1745 may be at a 90 degree angle. When the two surfaces butt against each other the desired angle is formed between the display sides of the tile and adjacent tile. In this example, the desired angle is about 190 degrees and a convex display is formed as shown in FIG. 14.

Channel 1707 may be referred to as an angle adjustment dowel receptacle. These receptacles are formed on a rear side of the tile and extend through one or more side edges of the tile. As seen in the figure, when the angle adjustment dowel receptacle receives the angle adjustment dowel, the dowel points towards the side edge. The angle adjustment dowel can be replaced from a back side of the tile.

Dowel 1725 may be referred to as an extension, stud, projection, peg, rod, or pin. The dowel can have any cross-sectional shape such as a circle, rectangle, square, star, triangle, pentagon, and so forth.

Figure 18:
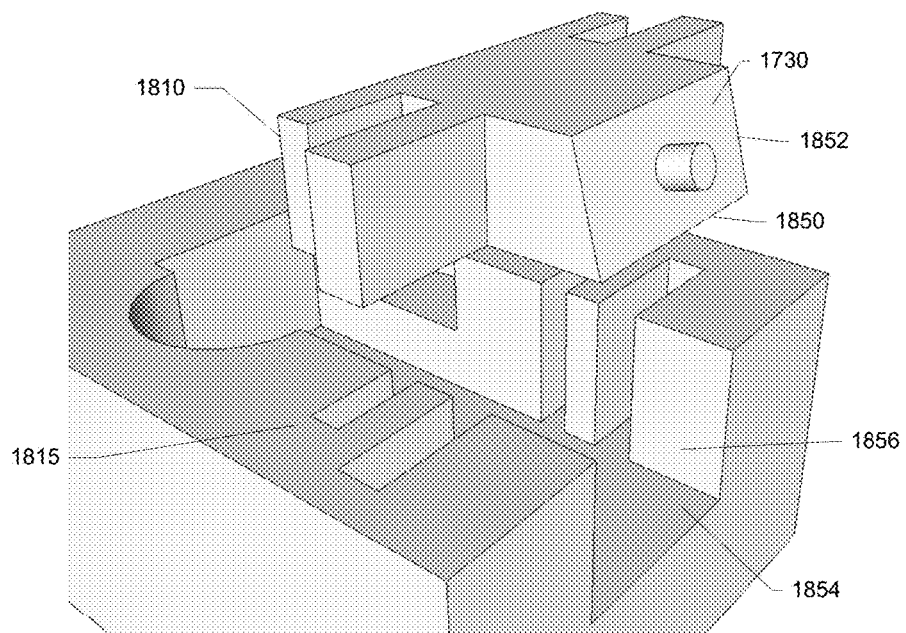
FIG. 18 shows another perspective view of the first angle adjustment dowel.

FIG. 18 shows another perspective view of angle adjustment dowel 1705 and surface 1730 from which dowel 1725 projects. The angle adjustment dowel (or block) includes a bottom edge 1850 and a side edge 1852. When the angle adjustment dowel is fitted into channel or receptacle 1707, the bottom edge touches a bottom surface 1854 of the receptacle. In this specific implementation, the bottom edge is visible through an opening 1856 of a first side edge (or first side surface) of the tile. The first side of the tile includes the first side surface joining a front surface and a back surface of the tile. In this specific implementation, surface 1730 is not coplanar with the first side surface of the tile.

Figure 21:
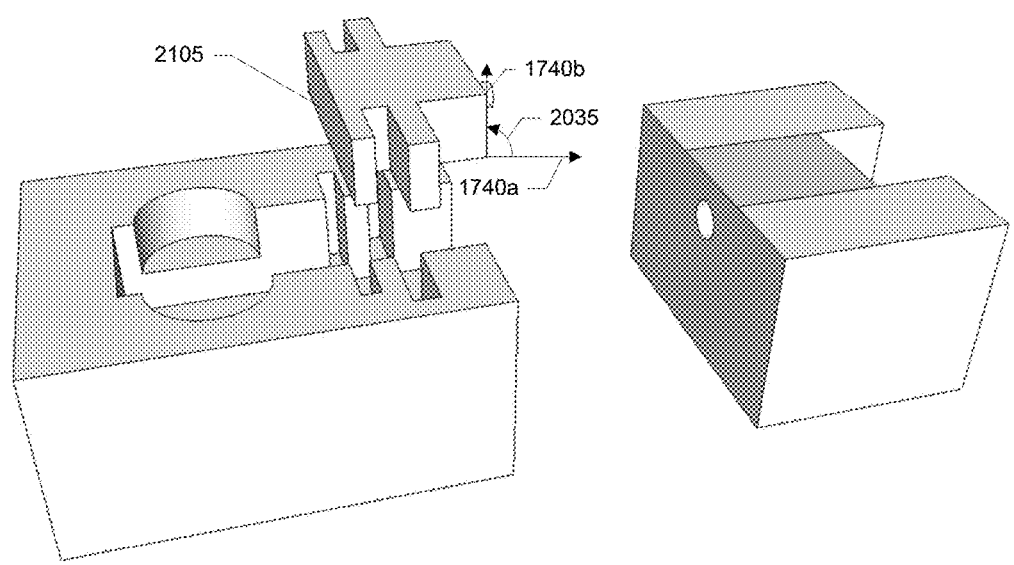
FIG. 21 shows a perspective view of a third angle adjustment dowel.
Figure 22:
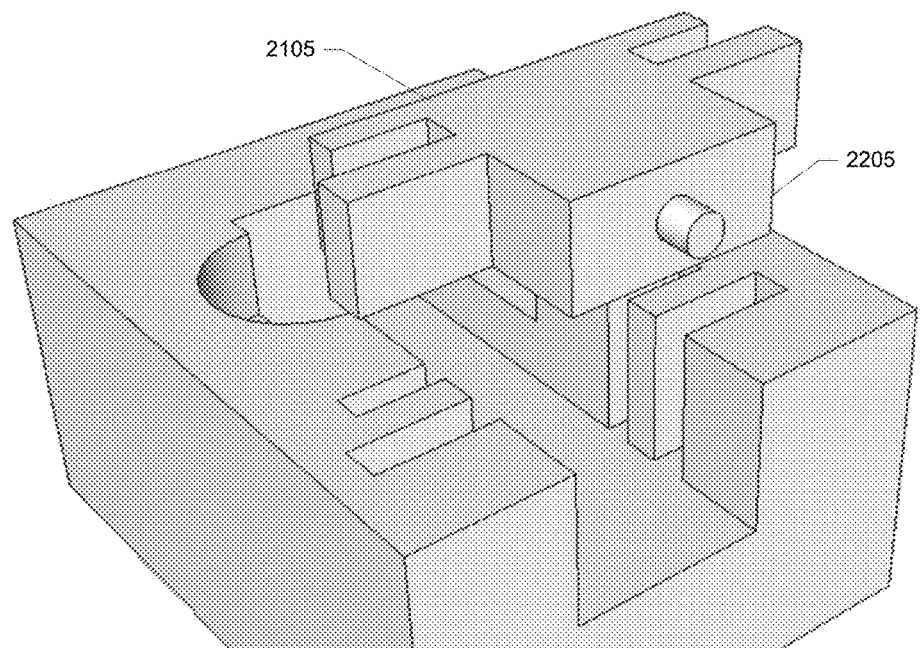
FIG. 22 shows another perspective view of the third angle adjustment dowel.

Angle adjustment dowel 1705 may be replaced with angle adjustment dowel 2105 (FIGS. 21-22). In a specific implementation, angle adjustment dowel 2105 also has a bottom edge that touches the bottom surface of the receptacle. A side edge 2205 of angle adjustment dowel 2105 extends to the bottom edge. The side edge is adjacent to the bottom edge. When angle adjustment dowel 2105 is fitted in the receptacle, side edge 2205 is visible through the opening at the first side edge and a surface from which the dowel of angle adjustment dowel 2105 projects from is planar with the first side surface of the tile.

The tile may further include a second side edge, opposite of the first edge. The second side edge may have a second opening. The second opening may have a cross-sectional shape that is the same as (or different from) a cross-sectional shape of the dowel.

As shown in this example, the dowel projects orthogonally from surface 1730 or is normal to surface 1730. However, in other implementations, the dowel may project at a different angle from surface 1730.

In a specific implementation, the angle adjustment dowel includes four fingers (e.g. guides, tabs, projections) 1810. The fingers are received by finger receptacles 1815 of clamp receptacle 1710. These fingers help ensure that the angle adjustment dowel is properly inserted into the clamp receptacle and help ensure that the angle adjustment dowel does not accidentally move or shift. In another implementation, the fingers are instead or additionally formed on the clamp receptacle and the finger receptacles are instead or additionally formed on the angle adjustment dowel.

The angle adjustment dowel may be further secured to the clamp receptacle using a retaining mechanism incorporated into the clamp receptacle. The retaining mechanism may include components such as a spring, tab, notch, and lever. The user can push the lever against the force of the spring which moves a tab and allows the angle adjustment dowel to slide into the clamp receptacle. When the lever is released the spring may urge the tab into a notch in the angle adjustment dowel. The angle adjustment dowel is then locked into place so that it can not accidentally fall out. The user can remove the angle adjustment dowel by again pushing the lever to urge the tab out of the notch. The angle adjustment dowel is now unlocked and can be pulled from the clamp receptacle. For example, the user can insert their finger into a portion of the channel, pinch the angle adjustment dowel, and pull the angle adjustment dowel out. A new angle adjustment dowel can then be inserted by following a reverse procedure.

The dowel and dowel receptacle can be used to help guide and align the interlocking of the tile and the adjacent tile. In this specific implementation, the dowel and dowel receptacle have circular cross sections. However, it should be appreciated that they can have any cross-sectional shape (e.g., square, rectangle, triangle, and so forth). Furthermore, there can be any number of dowels and any number of dowel receptacles. The dowel can be located anywhere on surface 1730. The dowel receptacle can be located anywhere on surface 1745.

The dowel and dowel receptacle are merely one example of a structural interface between the clamp receptacle and clamp clip which interlock a tile and an adjacent tile. In various other implementations, the structural interface may instead or additionally include a tongue and groove interface, a dovetail mating (i.e., a flaring tenon and a mortise into which it fits forming an interlocking joint), a ball and socket interface, and so forth.

In a specific implementation, the angle adjustment dowel is accessible from a back side of the tile via the adjustment receptacle. In this specific implementation, the receptacle is visible on the back side and extends along a portion of the back side to a side surface of the tile (i.e., through an opening on the side surface).

In another implementation, the angle adjustment dowel is instead accessible from the side surface of the tile. In this specific implementation, the angle adjustment dowel is not accessible from the back side. Rather, in this specific implementation, the angle adjustment dowel is inserted through the opening in the side surface of the tile. The receptacle may or may not be visible from the back side of the tile.

Angle 1735 of the angle adjustment dowel can have any measurement so that any angle can be formed between the tile and an adjacent tile.

Figure 19:
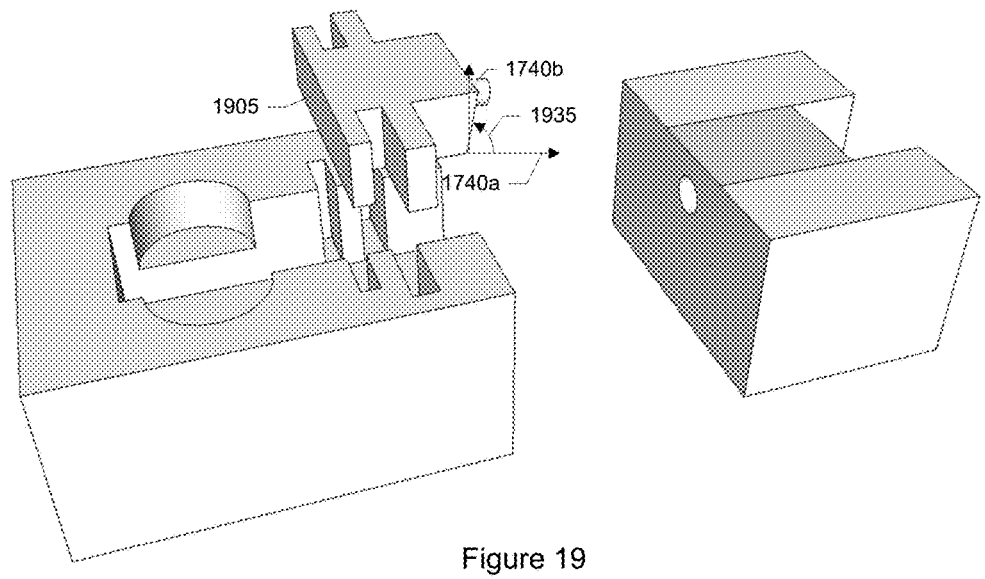
FIG. 19 shows a perspective view of a second angle adjustment dowel.

FIG. 19 shows a perspective view an angle adjustment dowel 1905 being inserted into clamp receptacle 1710. This angle adjustment dowel is similar to the angle adjustment dowel shown in FIGS. 17-18, but this angle adjustment dowel has a different angle. This angle adjustment dowel has an angle 1935 which as shown in the figure is less than 90 degrees as measured from x-axis 1740a.

In this specific implementation, when clamp receptacle 1710 of the tile is interlocked with clamp clip 1720 of the adjacent tile a concave display (FIG. 16A) is formed.

Figure 20:
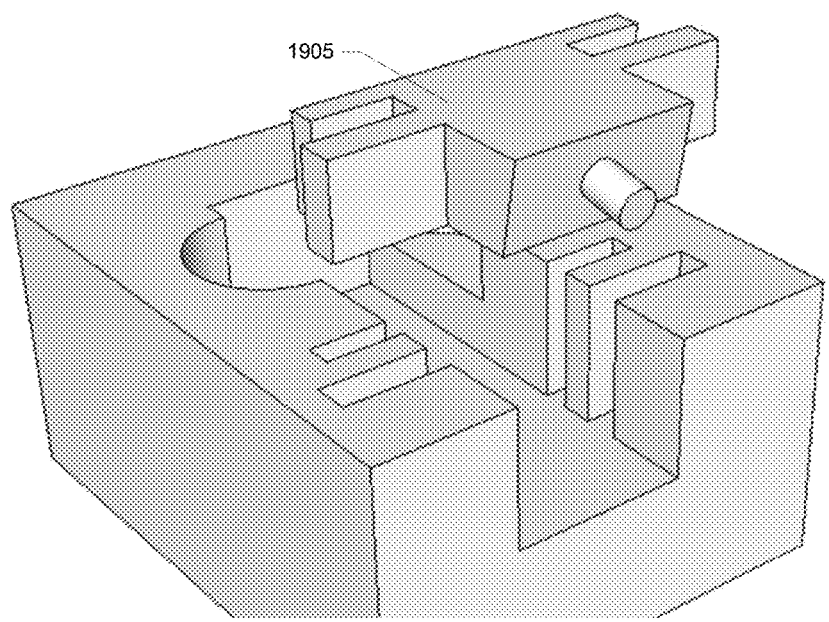
FIG. 20 shows another perspective view of the second angle adjustment dowel.

FIG. 20 shows another perspective view of angle adjustment dowel 1905.

FIG. 21 shows a perspective view of an angle adjustment dowel 2105. This angle adjustment dowel is similar to the angle adjustment dowels shown in FIGS. 17-18 and 19-20, but this angle adjustment dowel has a different angle. This angle adjustment dowel has an angle 2035 which as shown in the figure is about 90 degrees as measured from x-axis 1740a.

In this specific implementation, when the clamp receptacle of the tile is interlocked with the clamp clip of the adjacent tile a planar display (FIG. 15) is formed.

FIG. 22 shows another perspective view of angle adjustment dowel 2105.

The angle adjustment dowels shown in FIGS. 17-22 can have any angle. Depending on what type of display a user desires to create the user can select one or more angle adjustment dowels having a specific angle. The user can create planar, convex, or concave displays using the same tiles, but different angle adjustment dowels for each display type. Furthermore, combinations of different display types can be created. Using the tiles and angle adjustment dowels, displays resembling, for example, a bowl, pan, ball, sphere, ripples, or waves can be created. For example, a first portion of a display may have a concave arrangement of tiles. A second portion of the display may have a convex arrangement of tiles.

A user assembles a video display using one or more tiles such as shown in FIG. 5. The user can create any desired angle or curvature between two tiles by selecting the appropriate angle adjustment dowel and replacing (i.e., swapping or substituting) an old angle adjustment dowel. A representative flow for changing the angle between two tiles is outlined in steps 1 to 4 below.

1. Unlock and remove a tile of the display.
2. Remove a first angle adjustment dowel from the tile.
3. Insert a second angle adjustment dowel into the tile.
4. Place the tile back into the display.

In step 1, the tile is unlocked and removed from the display. For example, the tile may be unlocked by unclamping a first clamp portion of the tile from a second clamp portion of an adjacent tile. The tile can then be removed or pulled from the display.

In step 2, a first angle adjustment dowel is removed from the tile. The first angle adjustment dowel may be removed by pulling the first angle adjustment dowel from a cavity (e.g., hole, slot, opening, space, hollow, aperture, notch, or groove) in the first clamp portion.

Figure 23:
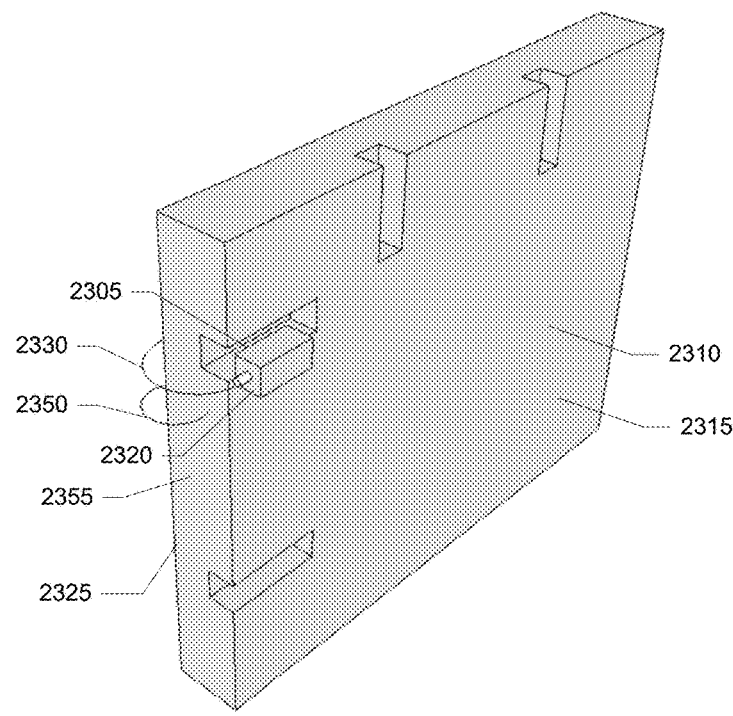
FIGS. 23-24 shows perspective views of replacing an angle adjustment dowel in a tile.

FIG. 23 shows a perspective view of removing first angle adjustment dowel 2305 from a rear (or back or nondisplay) side 2310 of a tile 2315. A face or surface 2320 of the first angle adjustment dowel may be perpendicular to a front or display side 2325 of the tile or may be at some other angle. In this specific implementation, the display side lies on a first plane. Surface 2320 lies on a second plane. The first and second planes intersect at a 90-degree angle. Depending on one's perspective, a first angle 2330 of the first angle adjustment dowel may be measured from the display side to surface 2320.

In step 3, a second angle adjustment dowel is inserted into the tile, i.e., inserted into the now empty cavity of the first clamp portion.

Figure 24:
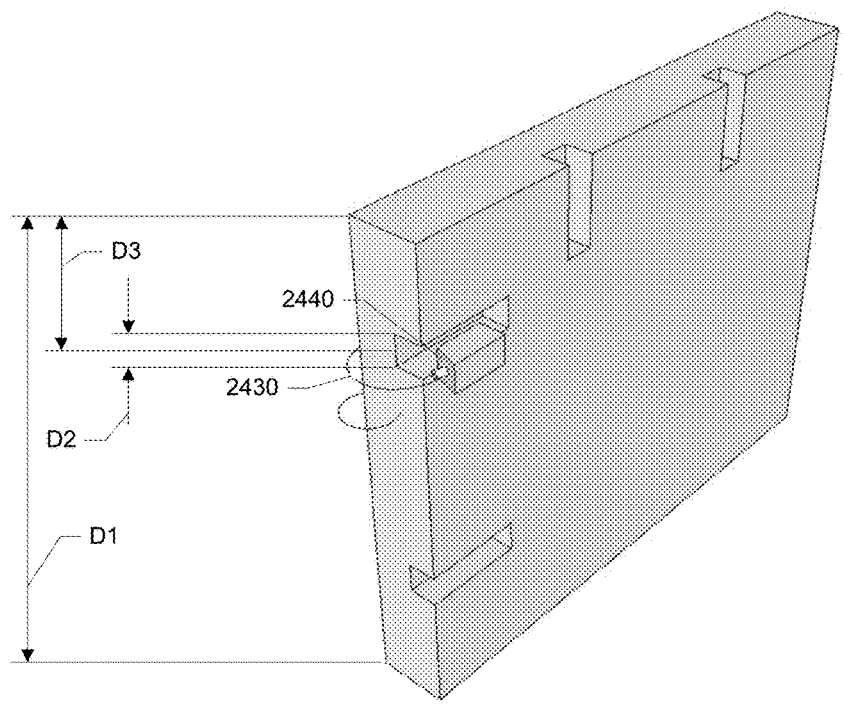

FIG. 24 shows a perspective view of inserting the second angle adjustment dowel into the tile. A second angle 2430 of the second angle adjustment dowel is measured from the display side to a surface 2440 of the second angle adjustment dowel. As seen in FIGS. 23-24, the second angle is different from the first angle.

The inserts, cavity, or both may have a keying feature to help ensure that the insert is inserted properly into the cavity. In an implementation, if the user attempts to place an insert into the cavity, but the insert is oriented incorrectly (e.g., upside down), the keying feature prevents the incorrectly oriented insert from being placed into the cavity. Furthermore, the insert, cavity, or both may have a locking feature so that the insert does not accidentally fall out when the tile is removed. The locking feature may be a magnet, a snap-fit mechanism between the insert and cavity, friction between the surfaces of the cavity and insert, and the like.

In step 4, the tile is placed back into the display.

Although the steps above are listed in a specific order, the steps may take place in any order, as desired and depending upon the specific application. There may be additional or other steps, which may replace one or more of the above steps. Certain steps may be repeated. For example, the tile may have two or more clamps that each need to be unlocked. Some of the two or more clamps may each have an angle adjustment dowel to be replaced. Some of the two or more clamps may have the same angle adjustment dowel (i.e., having same angles). Some of the two or more clamps may have different angle adjustment dowels (i.e., having different angles).

Referring now to FIGS. 23-24, a third angle 2350 is measured from the display side to a side (or side edge) 2355 of the tile.

In a specific implementation, a tile includes a display side and a side. The side is at a third angle with respect to the display side. The tile further includes a first angle adjustment dowel. The first angle adjustment dowel is at a first angle with respect to the display side. In this specific implementation, the first angle is the same as the third angle. In another implementation, the first angle is different from the third angle.

A method includes replacing the first angle adjustment dowel with a second angle adjustment dowel. The second angle adjustment dowel is at a second angle with respect to the display side. In this specific implementation, the second angle is different from the first angle. The second angle is different from the third angle.

In a specific implementation, the angle adjustment dowel in the tile is pushed or pulled towards the adjacent tile when the tile and adjacent tile are joined. In this specific implementation, the angle adjustment dowel is pulled by the force of the clamp clip or hook on the adjacent tile. The angle adjustment dowel in the tile slides (e.g., slides on a track) towards the adjacent tile so that the angle adjustment dowel can butt up against the adjacent tile; and so that the dowel receptacle in the adjacent tile can receive the dowel. Thus, in this specific implementation, the angled surface of the angle adjustment dowel (or a portion of the surface) will protrude past the side of the tile in order to meet a side of the adjacent tile. Similarly, the dowel (or a portion of the dowel) will protrude past the side of the tile in order to pass into the dowel receptacle in the adjacent tile. The clamp is then locked.

In this specific implementation, the angle adjustment dowel is under the force of a spring. The spring urges the angle adjustment dowel away from the adjacent tile. When the tile is disconnected from the adjacent tile the spring, i.e., clamp is unlocked, the spring causes the angle adjustment dowel to retract into the tile (i.e., away from the adjacent tile). The angle adjustment dowel may retract at such a distance into the channel of the tile that the dowel, the surface from which the dowel projects, or both do not project past the side of the tile. This can help prevent the angled adjustment dowel from snagging (e.g., prevent the dowel from snagging on a wire).

Thus, in a first position, the angle adjustment dowel of a tile does not project past a side of the tile. In a second position, a portion of the angle adjustment dowel projects past the side of the tile. The portion may project or be received by a receptacle (i.e., dowel receptacle) in an adjacent tile.

Referring now to FIG. 24, a distance D1 indicates a length of the tile. A distance D2 indicates a width of the angle adjustment dowel or channel in the clamp portion that receives the angle adjustment dowel. A distance D3 indicates a position of the angle adjustment dowel (or channel) along the length of the tile. As shown in the figure, distance D3 is measured from an edge (e.g., top edge) of the tile to the angle adjustment dowel.

In a specific implementation a ratio of D2 to D1 is about 1:22.6. Other examples of the ratio include 1:15, 1:16, 1:17, 1:18, 1:19, 1:20, 1:21.5, 1:21.6, 1:21.7, 1:21.8, 1:21.9, 1:22, 1:22.1, 1:22.2, 1:22.3, 1:22.4, 1:22.5, 1:22.7, 1:22.8, 1:22.9, 1:23, 1:23.1, 1:23.2, 1:23.3, 1:23.4, 1:23.5, 1:24, 1:25, 1:26, 1:27, 1:28, 1:29, and 1:30. A wider D2 offers more support and a greater area of surface contact between the angle adjustment dowel of a tile and the surface of an adjacent tile as compared to a narrower D2. A greater area of surface contact between the tiles can create a stiffer display.

However, a wider D2 (i.e., wider angle adjustment dowel) may require additional material as compared to a narrower D2. A narrower D2 (i.e., a narrower angle adjustment dowel) requires a smaller or narrower channel in the tile (or clamp portion). This can provide additional room in the tile for the electrical components (e.g., wiring) of the tile.

In a specific implementation, the angle adjustment dowel is positioned about one fifth down from the edge of the tile. That is, D3 is about 20 percent of D1, but can range from about 10 percent of D1 to about 50 percent of D1 (i.e., halfway down the tile). For example, D3 may be about 15, 25, 30, 35, 40, 45 percent, or more than 50 percent of D1. In other implementations D3 is less than 10 percent of D1. However, the angle adjustment dowel may be positioned anywhere along the side of the tile. For example, the angle adjustment dowel may be positioned one-fourth, one-third, or one-half (i.e., in the middle) down the side of the tile.

In a specific implementation, a video display includes a plurality of tiles. A first angle is between a first tile and a second tile. A method to change the first angle includes removing the first tile from the display. Removing a first angled insert having a second angle from the first tile. Inserting a second angled insert having a third angle, different from the second angle, into the first tile. Placing the first tile back into the display. A fourth angle, different from the first angle, is now between the first and second tiles.

A tile can have any number of angled inserts on any side of the tile and have any angle. This allows, for example, the creation of a video display that curves in multiple directions or dimensions such as a sphere (or a portion of a sphere) or a bowl (or a portion of a bowl). A user can change one or more angled inserts of a tile to vary the curvature or degree of curvature of the video display. A display can have a varying degree of curvature. For example, a degree of curvature for a portion of the display may be different from a degree of curvature for another portion of the display. In other words, the display can have increasing radii, decreasing radii, or both.

Depending upon the application, some angled inserts of a tile may not be replaced while other angled inserts of the tile are replaced. An angled insert of a tile may be switched from one side of the tile to another side (e.g., opposite side or adjacent side) of the tile.

In a specific implementation, method for changing a curvature of a video display having a plurality of tiles includes removing a tile from the display. The tile includes a first plurality of angled inserts. A first insert having a first angle is located on a first side (e.g., right-hand side) of the tile. A second insert having a second angle is located on the first side. The first and second angles may be the same or different. The method includes replacing the first insert with a third insert having a third angle and replacing the second insert with a fourth insert having a fourth angle. The third and fourth angles may be the same or different. The first angle may be the same or different from the third angle. The second angle may be the same or different from the fourth angle.

The second insert may instead be located on a second side (e.g., left-hand side) of the tile. The second side of the tile may be opposite the first side or adjacent to the first side (e.g., bottom side or top side).

In a specific implementation, angled inserts of two or more tiles of a display are changed to change the curvature of the display. The method includes removing a first tile from the display. Replacing a first angled insert having a first angle in the first tile with a second angled insert having a second angle, different from the first angle. Removing a second tile from the display. Replace a third angled insert having a third angle in the second tile with a fourth angled insert having a fourth angle, different from the third angle. Inserting the first and second tiles back into the display.

Generally, other tiles in the display adjacent to the tiles to be removed so that their angled inserts can be replaced can remain in situ.

In a specific implementation, a tile has two angle adjustment dowels on one side and two angle adjustment dowels on an adjacent side. However, a tile can have any number of angle adjustment dowels. A tile can have angle adjustment dowels having a first angle on a first side of the tile. The tile can have angle adjustment dowels having a second angle on a second side of the tile. The first and second angles may be the same or different. The first side may be opposite the second side. For example, the first side may be a top side and the second side may be a bottom side. The first side may be a left-hand side and the second side may be a right-hand side.

The first and second sides may be adjacent. For example, the first side may be a top side and the second side may be a right-hand side or a left-hand side.

Furthermore, in another specific implementation, angle adjustment dowels are received by both the clamp receptacle and the clamp clip. The angle adjustment dowel received by the clamp receptacle may have an angle that is different or the same as the angle of the angle adjustment dowel received by the clamp clip. An angle adjustment dowel may be received by the clamp clip, but not the clamp receptacle.

In various implementations, the angle adjustment dowels are included with the tiles when the tiles are purchased. The angle adjustment dowels are not included with the tiles and must be purchased separately. The angle adjustment dowels are included in a kit of angle adjustment dowels. The kit may be purchased separately from the tiles.

In a specific implementation, first and second angle adjustment dowels are fitted to first and second halves (e.g., sides, parts, or portions) of a clamp, respectively, have supplementary angles or angles such that when the first and second halves of the clamp are pulled together, a planar display is formed as shown, for example, in FIG. 8. In this specific implementation, the first and second angle adjustment dowels can have any angle so long as the first and second tiles, when brought together, form a 180 degree angle with respect to the viewing or display side. For example, the first and second angle adjustment dowels can have the same angle such as 90 degrees (e.g., 90 degrees+90 degrees=180 degrees). The first and second angle adjustment dowels can have different angles, such as 45 degrees and 135 degrees (e.g., 45 degrees+135 degrees=180 degrees).

In another implementation, first and second angle adjustment dowels have angles such that when the first and second halves of the clamp are pulled together, an angle between the first and second tile is greater than 180 degrees as shown, for example, in FIGS. 10 and 14 to produce a convex nonplanar display. For example, the first angle adjustment dowel may have a 90-degree angle and the second angle adjustment dowel may have a 95-degree angle (e.g., 90 degrees+95 degrees=185 degrees which is greater than 180 degrees).

In another implementation, the first and second angle adjustment dowels have angles such that when the first and second halves of the clamp are pulled together, an angle between the first and second tiles is less than 180 degrees as shown, for example, in FIGS. 12 and 16A to produce a concave nonplanar display. For example, the first angle adjustment dowel may have a 90-degree angle and the second angle adjustment dowel may have an 85-degree angle (e.g., 90 degrees+85 degrees=175 degrees which is less than 180 degrees). It should be appreciated that the first and second angle adjustment dowels can have any angle (e.g., 0, 5, 10, 15, 20, 25, 35, 45, 60, 90, or 135 degrees, and so forth). The angles may be supplementary as discussed or complementary (i.e., sum of their measures is 90 degrees). An angle can be acute (i.e., less than 90 degrees) or obtuse (i.e., between 90 degrees and 180 degrees).

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:
1. A method comprising:
providing a first light-emitting tile having a first plurality of light-emitting elements disposed on the tile and a first connecting member coupled to the first light-emitting tile;

providing a second light-emitting tile having a second plurality of light-emitting elements disposed on the tile and a second connecting member attached to the second light-emitting tile;

providing a first adjustment plate, wherein the first adjustment plate can be removably coupled to at least one of the first light-emitting tile and the second light-emitting tile; and configuring the first connecting member to couple with the second connecting member such that the first light-emitting tile is disposed adjacent to the second light-emitting tile to form a pivot point, wherein the pivot point is at a first side portion of the first light-emitting tile and at a second side portion of the second light-emitting tile, the first light-emitting tile comprises a first viewing side and a first rear side, opposite of the first viewing side, the second light-emitting tile comprises a second viewing side and a second rear side, opposite of the second viewing side, and the first adjustment plate is configured to be coupled via an opening of at least one of the first light-emitting tile or the second light-emitting tile, the first adjustment plate is accessible and replaceable from at least one of the first rear side or second rear side, when the first adjustment plate is coupled, and the first adjustment plate sets a first angle between the first and second viewing sides.

2. The method of claim 1 comprising removing the first adjustment plate from the opening of at least one of the first light-emitting tile or the second light-emitting tile; and inserting a second adjustment plate into the opening of at least one of the first light-emitting tile or the second light-emitting tile, such that the second adjustment plate sets a second angle between the first and second viewing sides and the first and second angles are different angles, wherein the first and second light-emitting tiles pivot about the pivot point when the first angle is changed to the second angle.

3. The method of claim 2 wherein the pivot point is located at a first vertex of the first angle and at a second vertex of the second angle.

4. The method of claim 1 wherein the pivot point is formed at the first viewing side of the first light-emitting tile and at the second viewing side of the second light-emitting tile.

5. The method of claim 1 wherein the pivot point is on a pivot seam and the pivot seam is formed at the first side portion of the first light-emitting tile and at the second side portion of the second light-emitting tile when the first and second light-emitting tiles are coupled by the first and second connecting members being coupled.

6. The method of claim 5 wherein the pivot seam is a pivot line.

7. The method of claim 5 wherein the pivot seam is formed at the first viewing side of the first light-emitting tile and at the second viewing side of the second light-emitting tile.

8. The method of claim 5 wherein the pivot seam is formed at a first edge of the first viewing side of the first light-emitting tile and at a second edge of the second viewing side of the second light-emitting tile.

9. The method of claim 8 wherein the pivot seam is located at a vertex of the first angle.

10. The method of claim 1 wherein the first adjustment plate is configured to abut the second connecting member when the first connecting member couples with the second connecting member.

11. The method of claim 1 wherein the first connecting member is accessible from the first rear side and the second connecting member is accessible from the second rear side.

12. The method of claim 1 wherein the first viewing side comprises the first plurality of light-emitting elements and the second viewing side comprises the second plurality of light-emitting elements.

13. The method of claim 1 wherein the pivot point is in a first plane of the first viewing side and in a second plane of the second viewing side.

14. A method comprising:

providing a first light-emitting tile having a first plurality of light-emitting elements disposed on the tile and a first connecting member coupled to the first light-emitting tile;

providing a second light-emitting tile having a second plurality of light-emitting elements disposed on the tile and a second connecting member attached to the second light-emitting tile;

providing a first adjustment plate, wherein the first adjustment plate can be removably coupled to at least one of the first light-emitting tile and the second light-emitting tile;

configuring the first connecting member to couple with the second connecting member such that the first light-emitting tile can be positioned adjacent to the second light-emitting tile, forming a seam between the first and second light-emitting tiles, the first light-emitting tile comprises a first viewing side and a first rear side, opposite of the first viewing side, the second light-emitting tile comprises a second viewing side and a second rear side, opposite of the second viewing side, a first angle between the first and second viewing sides of the first and second light-emitting tiles is adjustable about the seam, and the first adjustment plate is configured to be coupled via an opening of at least one of the first light-emitting tile or the second light-emitting tile that is accessible from at least one of the first rear side or second rear side, when the first adjustment plate is coupled, the first adjustment plate is accessible from the first rear side or second rear side, and the first adjustment plate sets the first angle between the first and second viewing sides;

configuring the first or second light-emitting tile for removal of the first adjustment plate from the opening of the first or second light-emitting tile from the first or second rear side; and configuring the first or second light-emitting tile for replacement of the first adjustment plate with a second adjustment plate in the opening of the first or second light-emitting tile from the first or second rear side when the first adjustment plate is removed from the opening of the first or second light-emitting tile from the first or second rear side, such that the second adjustment plate sets a second angle between the first and second viewing sides and the first and second angles are different angles.

15. The method of claim 14 wherein the seam is formed where the first viewing side of the first light-emitting tile meets with the second viewing side of the second light-emitting tile.

16. The method of claim 14 wherein a first side edge joins the first viewing side and the first rear side, and a second side edge joins the second viewing side and the first rear side.

17. The method of claim 14 wherein the first and second light-emitting tiles can pivot about the seam when the first adjustment plate is replaced by the second adjustment plate.

18. The method of claim 14 wherein the seam is located at a first vertex of the first angle and at a second vertex of the second angle.

19. The method of claim 14 wherein the first adjustment plate is configured to abut the second connecting member when the first connecting member couples with the second connecting member.

20. The method of claim 14 wherein the first connecting member is accessible from the first rear side and the second connecting member is accessible from the second rear side.

21. The method of claim 14 wherein the first viewing side comprises the first plurality of light-emitting elements and the second viewing side comprises the second plurality of light-emitting elements.

22. A method comprising:
providing a first light-emitting tile having a first plurality of light-emitting elements disposed on the tile and a first connecting member coupled to the first light-emitting tile;
providing a second light-emitting tile having a second plurality of light-emitting elements disposed on the tile and a second connecting member attached to the second light-emitting tile;
providing a first adjustment plate, wherein the first adjustment plate can be removably coupled to at least one of the first light-emitting tile and the second light-emitting tile;
configuring the first connecting member to couple with the second connecting member, such that the first light-emitting tile can be positioned adjacent to the second light-emitting tile, forming a seam between the first and second light-emitting tiles,
the first light-emitting tile comprises a first viewing side and a first rear side, opposite of the first viewing side,
the second light-emitting tile comprises a second viewing side and a second rear side, opposite of the second viewing side,
a first angle between the first and second viewing sides of the first and second light-emitting tiles is adjustable about the seam, and
the first adjustment plate is configured to be coupled via an opening of at least one of the first light-emitting tile or the second light-emitting tile that is accessible from at least one of the first rear side or second rear side, when the first adjustment plate is coupled, the first adjustment plate is accessible from the first rear side or second rear side, and the first adjustment plate sets the first angle between the first and second viewing sides; and
configuring the first or second light-emitting tiles for insertion of a second adjustment plate into the opening of the first or second light-emitting tile from the first or second rear side, such that the first and second adjustment plates in the opening of the first or second light-emitting tile sets a second angle between the first and second viewing sides and the first and second angles are different angles.

23. The method of claim 22 wherein the seam is formed where the first viewing side of the first light-emitting tile meets with the second viewing side of the second light-emitting tile.

24. The method of claim 22 wherein a first side edge joins the first viewing side and the first rear side, and a second side edge joins the second viewing side and the first rear side.

25. The method of claim 22 wherein the first and second light-emitting tiles can pivot about the seam when the second adjustment plate is placed in the opening of the first or second light-emitting tile with the first adjustment plate.

26. The method of claim 22 wherein the seam is located at a first vertex of the first angle and at a second vertex of the second angle.

27. The method of claim 22 wherein the first adjustment plate is configured to abut the second connecting member at the seam when the first connecting member couples with the second connecting member.

28. The method of claim 22 wherein the first connecting member is accessible from the first rear side and the second connecting member is accessible from the second rear side.

29. The method of claim 22 wherein the first viewing side comprises the first plurality of light-emitting elements and the second viewing side comprises the second plurality of light-emitting elements.

30. A method comprising:
providing a first light-emitting tile having a first plurality of light-emitting elements disposed on the tile and a first connecting member coupled to the first light-emitting tile;
providing a second light-emitting tile having a second plurality of light-emitting elements disposed on the tile and a second connecting member attached to the second light-emitting tile;
providing a first adjustment plate, wherein the first adjustment plate can be removably coupled to a first opening of the first light-emitting tile;
coupling the first connecting member to the second connecting member, wherein the coupling forms a seam between the first and second light-emitting tiles,
wherein the first light-emitting tile comprises a first viewing side and a first rear side, opposite of the first viewing side, the second light-emitting tile comprises a second viewing side and a second rear side, opposite of the second viewing side, and a first angle between the first and second viewing sides of the first and second light-emitting tiles is adjustable about the seam;
coupling the first adjustment plate to the first opening of the first light-emitting tile through at least one of the first or second rear sides, wherein when coupled, the first adjustment plate maintains a fixed second angle as the first angle between the first and second viewing sides;
coupling the second adjustment plate to a second opening of the second light-emitting tile through at least one of the first or second rear sides, wherein when coupled, the second adjustment plate maintains a fixed third angle as the first angle between the first and second viewing sides.

31. The method of claim 30 wherein when the second adjustment plate is coupled to the second opening, the first adjustment plate is coupled to the first opening and the fixed third angle is a result of a combination of the first and second adjustment plates.

32. The method of claim 30 wherein when the second adjustment plate is coupled to the second opening, the first adjustment plate is decoupled from the first opening and the fixed third angle is a result of solely the second adjustment plate.

33. The method of claim 30 wherein the fixed third angle is different from the fixed second angle.

34. The method of claim 30 wherein the fixed third angle is the same as the fixed second angle.

35. The method of claim 30 wherein when the second adjustment plate is coupled to the second opening, the first adjustment plate is decoupled from the first opening and the fixed third angle is a result of solely the second adjustment plate, and the fixed third angle is the same as the fixed second angle, and the method further comprises coupling a combination of the first and second adjustment plates to first and second openings, respectively, through at least one of the first or second rear sides, wherein when coupled, the combination of the first and second adjustment plates maintains a fixed fourth angle as the first angle between the first and second viewing sides, wherein the fixed fourth angle is different from the fixed second angle.

* * * * *